United States Patent
Lv et al.

(10) Patent No.: US 12,287,106 B2
(45) Date of Patent: Apr. 29, 2025

(54) AIR CONDITIONER CONTROL METHOD, AIR CONDITIONER, SERVER AND COMPUTER-READABLE STORAGE MEDIUM

(71) Applicants: GD MIDEA AIR-CONDITIONING EQUIPMENT CO., LTD., Guangdong (CN); MIDEA GROUP CO., LTD., Guangdong (CN)

(72) Inventors: Chuang Lv, Guangdong (CN); Qifeng Fan, Guangdong (CN); Min Pang, Guangdong (CN); Haoliang Zhai, Guangdong (CN); Jiwei Hei, Guangdong (CN); Jingchun Liu, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 692 days.

(21) Appl. No.: 17/560,894

(22) Filed: Dec. 23, 2021

(65) Prior Publication Data
US 2022/0113051 A1    Apr. 14, 2022

Related U.S. Application Data

(63) Continuation of application No. PCT/CN2020/087303, filed on Apr. 27, 2020.

(30) Foreign Application Priority Data

Jun. 30, 2019 (CN) ............... 201910588845.X
Feb. 26, 2020 (CN) ............... 202010122867.X

(51) Int. Cl.
*F24F 11/65*    (2018.01)
*G05B 13/04*    (2006.01)
(Continued)

(52) U.S. Cl.
CPC ............ *F24F 11/65* (2018.01); *G05B 13/042* (2013.01); *F24F 2110/10* (2018.01);
(Continued)

(58) Field of Classification Search
CPC ................................................. F24F 2120/12
See application file for complete search history.

(56) References Cited

U.S. PATENT DOCUMENTS 9,323,255 B2 *  4/2016  Chan .................. G05B 15/02
9,449,491 B2 *  9/2016  Sager ................. G06F 3/04842
(Continued)

FOREIGN PATENT DOCUMENTS

CN    103994544 A    8/2014
CN    105180346 A    12/2015
(Continued)

OTHER PUBLICATIONS

Supplementary European Search Report dated Aug. 4, 2022 received in European Patent Application No. EP 20834204.8.
(Continued)

*Primary Examiner* — Nathan L Laughlin
(74) *Attorney, Agent, or Firm* — Scully, Scott, Murphy & Presser, P.C.

(57) ABSTRACT

The present application discloses an air conditioner control method. The method includes obtaining a position of a user; detecting that the position of the user meets a preset condition, and obtaining a target operating parameter of an air conditioner, the preset condition being determined according to a preset running time span, and the preset running time span being determined according to a current environmental parameter and a target environmental parameter, and the current environmental parameter comprising at least one of a current indoor temperature, a current indoor humidity, a current air cleanliness and a current air freshness; and
(Continued)

controlling the air conditioner at a target position to operate with the target operating parameter. The present application also discloses an air conditioner, a server and a computer readable storage medium.

26 Claims, 12 Drawing Sheets

(51) Int. Cl.
*F24F 110/10* (2018.01)
*F24F 110/20* (2018.01)
*F24F 110/50* (2018.01)
*F24F 120/12* (2018.01)
*F24F 130/10* (2018.01)

(52) U.S. Cl.
CPC ....... *F24F 2110/20* (2018.01); *F24F 2110/50* (2018.01); *F24F 2120/12* (2018.01); *F24F 2130/10* (2018.01)

(56) References Cited

U.S. PATENT DOCUMENTS

| | | | | |
|---|---|---|---|---|
| 2010/0289643 A1* | 11/2010 | Trundle | ................. | F24F 11/523 340/3.1 |
| 2014/0309788 A1* | 10/2014 | Blum | .................... | H04W 4/029 700/276 |
| 2015/0136379 A1* | 5/2015 | Takeda | ..................... | F24F 11/70 165/266 |
| 2016/0228640 A1* | 8/2016 | Pindado | ............. | A61N 1/37282 |
| 2017/0176038 A1 | 6/2017 | Munier et al. | | |
| 2017/0241660 A1 | 8/2017 | Sekar et al. | | |
| 2018/0198637 A1* | 7/2018 | Combe | ............... | H04L 12/2825 |
| 2018/0299152 A1* | 10/2018 | Libal | ..................... | H04W 4/021 |

FOREIGN PATENT DOCUMENTS

| | | |
|---|---|---|
| CN | 105180363 A | 12/2015 |
| CN | 106352485 A | 1/2017 |
| CN | 106382725 A | 2/2017 |
| CN | 108119982 A | 6/2018 |
| CN | 109405195 A | 3/2019 |
| EP | 2 790 082 A2 | 10/2014 |
| EP | 3 001 116 A1 | 3/2016 |
| JP | 2003065595 A | 3/2003 |
| JP | 2003153567 A | 5/2003 |
| KR | 20180075721 A | 7/2018 |

OTHER PUBLICATIONS

International Search Report dated Jul. 8, 2020 received in International Application No. PCT/CN2020/087303 together with an English language translation.
First Office Action dated Jun. 24, 2021 received in Chinese Patent Application No. CN 202010122867.X together with an English language translation.
Second Office Action dated Jan. 20, 2022 received in Chinese Patent Application No. CN 202010122867.X together with an English language translation.

* cited by examiner

AIR CONDITIONER CONTROL METHOD, AIR CONDITIONER, SERVER AND COMPUTER-READABLE STORAGE MEDIUM

CROSS-REFERENCE TO RELATED APPLICATIONS

This application is a continuation application of PCT International Application No. PCT/CN2020/087303, filed on Apr. 27, 2020, which claims the priority to and benefits of Chinese Patent Application No 201910588845.X filed on Jun. 30, 2019, and titled "Air conditioner and Control Method Thereof, Control Terminal, Server and Storage medium", and Chinese Patent Application No. 202010122867.X filed on Feb. 26, 2020 and titled "Control Method of Air Conditioner, Air Conditioner, Server and Storage Medium", the entire contents of which are incorporated in this application by reference for all purposes. No new matter has been introduced.

TECHNICAL FIELD

The present application relates to the technical field of air conditioning, in particular to an air conditioner control method, an air conditioner, a server and a computer-readable storage medium.

BACKGROUND

At present, as air conditioners are gaining popularity and more air conditioners are installed, air conditioners are used more frequently. When air conditioners are being used in users' normal lives, the users often hope that the air conditioner can achieve the comfortable indoor environmental parameters in advance when they arrive home (for example, users often feel too hot when they arrive home in summer, so they hope that the indoor temperature can be lowered before they arrive home). Although all air conditioners certainly have the function of starting up at fixing times, if the users do not know the time required for the air conditioner to make the indoor environmental parameters reach the users' expectations, starting the air conditioner too early before the user arrives home will cause waste of electric energy, but if the air conditioner is not started timely, the air conditioner will not be able to create a comfortable environment for the users in time.

SUMMARY

The main objective of the present application is to provide an air conditioner control method, an air conditioner, an air conditioner control terminal, a server and a computer readable storage medium. By controlling the air conditioner to start in time, the air conditioner can create a comfortable environment for users under the condition of effectively saving energy.

In order to achieve the above objective among others, the present application provides an air conditioner control method, which includes:

acquiring a position of a user;
detecting that the position of the user meets a preset condition, and obtaining a target operating parameter of an air conditioner, the preset condition being determined according to a preset running time span, and the preset running time span being determined according to a current environmental parameter and a target environmental parameter, and the current environmental parameter including at least one of a current indoor temperature, a current indoor humidity, a current air cleanliness and a current air freshness;
controlling the air conditioner at a target position to operate with the target operating parameter.

In an embodiment, before the step of detecting that the position of the user meets the preset condition, and obtaining the target operating parameter of the air conditioner, the air conditioner control method further includes:

acquiring current environmental parameters and target environmental parameters of a space where the air conditioner locates;
determining running time spans required by the air conditioner to make the current environmental parameters reach the corresponding target environmental parameters, where the current environmental parameters include at least two of the current indoor temperature, the current indoor humidity, the current air cleanliness and the current air freshness;
determining the preset running time span of the air conditioner according to the running time spans.

In an embodiment, the step of determining the preset running time span of the air conditioner according to the running time spans includes:

determining the preset running time span according to a running time span corresponding to a target environmental parameter with the highest priority;
or, determining the preset running time span according to the longest one of the running time spans;
or, taking all the running time span as the preset running time span.

In an embodiment, the preset condition includes a pre-start condition of the air conditioner, and the position of the user meeting the pre-start condition of the air conditioner includes at least one of the following:

the position of the user being in a first preset range;
a time span required for the user to reach the target position from the position being less than or equal to a first preset time span;
receiving a pre-start instruction sent from a mobile terminal, where the mobile terminal detects that the position of the user is within the first preset range, or the time span required for the user to reach the target position is less than or equal to the first preset time span, and sends out the pre-start instruction.

In an embodiment, the air conditioner control method includes:

determining that the position of the user meets the preset condition, and sending first prompt information for starting the air conditioner in advance to the mobile terminal;
receiving first confirmation information, and performing the step of obtaining the target operating parameter of the air conditioner.

In an embodiment, the air conditioner control method includes:

determining that the position of the user meets the preset condition, and sending second prompt information for modifying an operating parameter of the air conditioner to the mobile terminal;
receiving second confirmation information sent from the mobile terminal, and acquiring a modified operating parameter according to the second confirmation information, and modifying the target operating parameter according to the modified operating parameter.

In an embodiment, the preset condition includes a starting condition of the air conditioner, and the user meeting the starting condition of the air conditioner includes at least one of the following:

a current position of the user being in a second preset range, where a distance between the first preset range and the air conditioner is greater than a distance between the second preset range and the air conditioner;

a time span required for the user to reach the target position from the current position being less than or equal to a second preset time span less than the first preset time span;

receiving a starting instruction sent from the mobile terminal, where the mobile terminal detects that the position of the user is within the second preset range, or that the time span required for the user to reach the target position is less than or equal to the second preset time span, and sends out the starting instruction.

In an embodiment, the first preset range and the second preset range are determined according to the preset running time span, a moving speed of the user, and a route taken by the user to the target position.

In an embodiment, the route and the moving speed are determined according to at least one of a travel way of the user and road condition information corresponding to a current time period.

In an embodiment, before the step of detecting that the position of the user meets the preset condition, and obtaining the target operating parameter of the air conditioner, the air conditioner control method further includes:

forming a starting position curve according to a plurality of starting positions corresponding to the second preset range;

outputting fourth prompt information according to the starting position curve.

In an embodiment, the step of forming the starting position curve according to the plurality of starting positions corresponding to the second preset range includes:

determining a second preset range according to each of preset running time spans when the air conditioner has at least two preset running time spans;

connecting a plurality of starting positions corresponding to each of the second preset ranges to form a starting position curve corresponding to each second preset range;

marking the starting position curve corresponding to each second preset range according to a target environmental parameter corresponding to each second preset range.

In an embodiment, after the step of outputting the fourth prompt information according to the starting position curve, the air conditioner control method further includes:

receiving a response instruction corresponding to the fourth prompt information, and acquiring the starting position curve targeted by the response instruction;

updating the starting condition of the air conditioner according to the second preset range corresponding to the acquired starting position curve.

In an embodiment, the target operating parameter is determined according to at least one of an operating parameter set by the user, a habitual operating parameter corresponding to the user, a district where the air conditioner is located, a group the user belongs, a current time period, a dressing index of users and a current weather parameter.

In an embodiment, after the step of obtaining the position of the user, the air conditioner control method further includes:

determining that the position of the user meets the preset condition, and obtaining an image of a space where the air conditioner is located;

determining that the space is not closed according to the image, and sending third prompt information that the space where the air conditioner is located is not closed to the mobile terminal, so that the user can determine whether to accept the air conditioner to run in advance based on the mobile terminal;

receiving third confirmation information, and performing the step of obtaining the target operating parameter of the air conditioner.

In an embodiment, after the step of controlling the air conditioner to operate with the target operating parameter, the air conditioner control method further includes:

acquiring a change amount of an environmental parameter of the air conditioner in a fourth preset time span; and determining that the change amount of the environmental parameter is smaller than a preset change amount of the environmental parameter and a difference between the preset change amount of the environmental parameter and the change amount of the environmental parameter is larger than a preset difference value, and increasing an output of the air conditioner;

where the output is cooling energy when the air conditioner runs in a cooling mode, and the output is heating energy when the air conditioner runs in a heating mode.

In an embodiment, the preset change amount of the environmental parameter is determined according to the preset running time span and an environmental parameter corresponding to that the position of the user meets the preset condition.

In an embodiment, after the step of controlling the air conditioner to operate with the target operating parameter, the air conditioner control method further includes:

determining a distance between the user and the target position according to a current position of the user;

determining that the distance is greater than a target distance, and controlling the air conditioner to stop, where the target distance is determined according to the preset running time span.

In an embodiment, after the step of controlling the air conditioner to operate with the target operating parameter, the air conditioner control method further includes:

determining a current moving speed of the user according to information of at least two positions of the user;

adjusting an output of the air conditioner according to a difference between the current moving speed and a preset moving speed, the larger the difference between the current moving speed and the preset moving speed, and the larger the output, where the output is cooling energy when the air conditioner is in a cooling mode, and the output is heating energy when the air conditioner is in a heating mode.

In an embodiment, after the step of controlling the air conditioner at the target position to operate with the target operating parameter, the air conditioner control method further includes:

acquiring a correspondence relationship between the target environmental parameter of the target position and the position of the user; and sending the correspondence relationship to the mobile terminal for display.

In an embodiment, the correspondence relationship is displayed in a preset shape, boundary points on the preset shape include the position of the user, and the boundary points constitute a current environmental parameter line, and the preset shape is a circle or a polygon.

In an embodiment, in correspondence relationships displayed by the mobile terminal, values of target environmental parameters of a same category are different;
    sending a correspondence relationship corresponding to a current position of the user to the mobile terminal;
    or, sending a correspondence relationship corresponding to the target environmental parameter to the mobile terminal, where the target environmental parameter is preset by the user or determined according to a usage habit of the user using the air conditioner.

In an embodiment, after the step of sending the correspondence relationship to the mobile terminal, the air conditioner control method further includes:
    receiving modification information of the target environmental parameter based on the correspondence relationship, and determining a modified target environmental parameter according to the modification information;
    re-determining a target operating parameter and a correspondence relationship according to the position of the user corresponding to the correspondence relationship and the modified target environmental parameter; and
    sending the re-determined correspondence relationship to the mobile terminal, and controlling the air conditioner to operate according to the re-determined target operating parameter.

In an embodiment, the target position is determined based on a current time period, the user's schedule, or a place input by the user.
    To achieve the above objective, the present application also provides an air conditioner. The air conditioner includes a memory, a processor, and an air conditioner control program stored on the memory and executable by the processor. When the air conditioner control program is executed by the processor, the steps of the above-mentioned air conditioner control method are realized.
    In order to achieve the above objective, the present application also provides an air conditioner control terminal. The control terminal includes a memory, a processor, and an air conditioner control program stored on the memory and executable by the processor. When the air conditioner control program is executed by the processor, the steps of the above-mentioned air conditioner control method are realized.
    To achieve the above objective, the present application also provides a server. The server includes a memory, a processor, and an air conditioner control program stored on the memory and executable by the processor. When the air conditioner control program is executed by the processor, the steps of the above-mentioned air conditioner control method are realized.
    The present application also provides a computer-readable storage medium, the computer-readable storage medium stores an air conditioner control program, when the air conditioner control program is executed by a processor, the steps of the above-mentioned air conditioner control method are realized.
    One or more technical solutions provided in the embodiments of the present application have at least the following technical effects or advantages:
    1. By controlling the air conditioner to start in time according to the user's time to home and the preset running time span of the air conditioner, the user can enjoy a comfortable environment as soon as he enters the room, and it avoids wasting electric energy caused by starting the air conditioner too early, thereby realizing that the air conditioner can create a comfortable environment for the user under the condition of effectively saving energy.
    2. By accurately obtaining the user's movement situation, it can accurately judge whether the user really goes home, and control the working state of the air conditioner based on this, so as to give the user a comfortable environment when the user reaches home, and avoid wasting energy by mistakenly starting the air conditioner when the user just passes by.
    3. According to the current environmental parameters and the user's usage habits of using the air conditioner, the operating parameters of the air conditioner which can make the user feel comfortable are determined in real time, so as to create a comfortable environment for the user and improve the user's experience of using the air conditioner.
    4. According to the current indoor and outdoor environmental parameters, the preset running time span of the air conditioner can be accurately determined, which not only can create a comfortable environment for users, but also can avoid energy waste.
    5. The mobile terminal carried by the user determines the position information of the user through network communication, so that a mobile terminal that does not support GPS positioning all the time can also obtain the position information of the user in real time.

DETAILED DESCRIPTION OF THE EMBODIMENTS

The realization of the objectives, functional features and advantages of the present application will be further explained with reference to the accompanying drawings in combination with the embodiments.

It should be understood that the specific embodiments described herein are intended to illustrate the present application only and are not intended to limit the present application.

The present application provides an air conditioner control method, which controls an air conditioner to start in time according to a time span that a user takes to arrive home and a preset running time span of the air conditioner. The user can enjoy a comfortable ambient temperature as soon as the user enters the room, and at the same time electric energy wasting caused by starting the air conditioner too early can be avoided, thereby realizing that the air conditioner can create a comfortable environment for the user under the condition of effectively saving energy.

Figure 1:
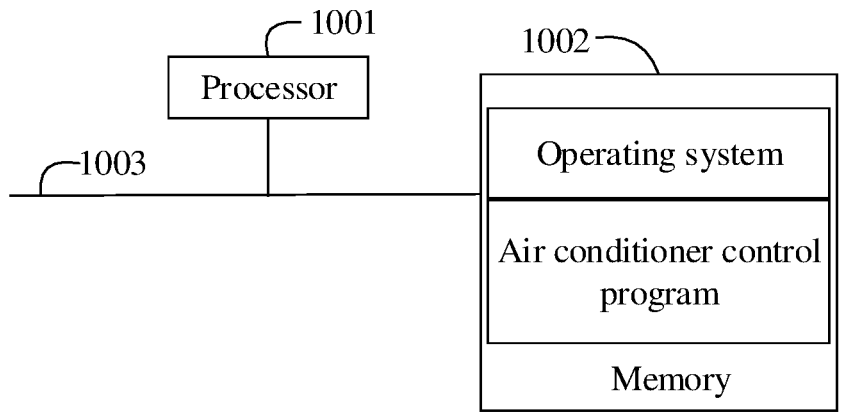
FIG. 1 is a schematic diagram of a hardware operation environment of an embodiment terminal related to embodiments of the present application.

As shown in FIG. 1, FIG. 1 is a schematic diagram of a hardware operation environment of an embodiment terminal related to the embodiments of the present application.

The embodiment terminal of the present application can be an air conditioner, a control terminal or a server for controlling the air conditioner.

In order to better understand the above technical solution, exemplary embodiments of the present disclosure will be described in more detail below with reference to the accompanying drawings. Though the exemplary embodiments of the present disclosure are shown in the drawings, it should be understood that the present disclosure may be implemented in various forms and should not be limited by the embodiments set forth herein. These embodiments are provided to enable a more thorough understanding of the disclosure and to fully convey the scope of the disclosure to those skilled in the art.

As shown in FIG. 1, the terminal can include a processor 1001 such as a CPU, a memory 1002 and a communication bus 1003. The communication bus 1003 is used to realize the connection and communication between components of the terminal. The memory 1002 may be a high-speed random-access memory or a non-volatile memory such as a disk memory. The memory 1002 may optionally be a storage device independent of the processor 1001 described above.

Those skilled in the art will appreciate that the configuration of the terminal shown in FIG. 1 does not limit the embodiment terminal of the present application, which may include more or fewer components than illustrated, or a combination of certain components, or different component arrangements.

As shown in FIG. 1, as a computer-readable storage medium, the memory 1002 can include an air conditioner control program.

In the terminal shown in FIG. 1, the processor 1001 can be used to invoke the air conditioner control program stored in the memory 1002 and perform the following operations:

acquiring a position of a user;
detecting that the position of the user meets a preset condition, and obtaining a target operating parameter of an air conditioner, the preset condition being determined according to a preset running time span, and the preset running time span being determined according to a current environmental parameter and a target environmental parameter, and the current environmental parameter including at least one of a current indoor temperature, a current indoor humidity, a current air cleanliness and a current air freshness;
controlling the air conditioner at a target position to operate with the target operating parameter.

Further, the processor 1001 can invoke the air conditioner control program stored in the memory 1002 and also perform the following operations:

acquiring current environmental parameters and target environmental parameters of a space where the air conditioner locates;
determining running time spans required by the air conditioner to make the current environmental parameters reach the corresponding target environmental parameters, where the current environmental parameters include at least two of the current indoor temperature, the current indoor humidity, the current air cleanliness and the current air freshness;
determining the preset running time span of the air conditioner according to the running time spans.

Further, the processor 1001 can invoke the air conditioner control program stored in the memory 1002 and also perform the following operations:

determining the preset running time span according to a running time span corresponding to a target environmental parameter with the highest priority;
or, determining the preset running time span according to the longest one of the running time spans;
or, taking all the running time spans as the preset running time span.

Further, the processor 1001 can invoke the air conditioner control program stored in the memory 1002 and also perform the following operations:

the position of the user being in a first preset range;
a time span required for the user to reach the target position from the position being less than or equal to a first preset time span;
receiving a pre-start instruction sent from a mobile terminal, where the mobile terminal detects that the position of the user is within the first preset range, or the time span required for the user to reach the target position is less than or equal to the first preset time span, and sends out the pre-start instruction.

Further, the processor 1001 can invoke the air conditioner control program stored in the memory 1002 and also perform the following operations:

determining that the position of the user meets the preset condition, and sending first prompt information for starting the air conditioner in advance to the mobile terminal;
receiving first confirmation information, and performing the step of acquiring a target operating parameter of the air conditioner.

Further, the processor 1001 can invoke the air conditioner control program stored in the memory 1002 and also perform the following operations:

determining that the position of the user meets the preset condition, and sending second prompt information for modifying an operating parameter of the air conditioner to the mobile terminal;
receiving second confirmation information sent from the mobile terminal, and acquiring a modified operating parameter according to the second confirmation information, and modifying the target operating parameter according to the modified operating parameter.

Further, the processor 1001 can invoke the air conditioner control program stored in the memory 1002 and also perform the following operations:
  a current position of the user being in a second preset range, where a distance between the first preset range and the position of the air conditioner is greater than a distance between the second preset range and the position of the air conditioner;
  a time span required for the user to reach the target position being less than or equal to a second preset time span less than the first preset time span;
  receiving a starting instruction sent from the mobile terminal, where the mobile terminal detects that the position of the user is within the second preset range, or that the time span required for the user to reach the target position is less than or equal to the second preset time span, and sends out the starting instruction.

Further, the processor 1001 can invoke the air conditioner control program stored in the memory 1002 and also perform the following operations:
  the first preset range and the second preset range being determined according to the preset running time span, a moving speed of the user, and a route taken by the user to the target position.

Further, the processor 1001 can invoke the air conditioner control program stored in the memory 1002 and also perform the following operations:
  the route and the moving speed being determined according to at least one of a travel way of the user and road condition information corresponding to a current time period.

Further, the processor 1001 can invoke the air conditioner control program stored in the memory 1002 and also perform the following operations:
  forming a starting position curve according to a plurality of starting positions corresponding to the second preset range;
  outputting fourth prompt information according to the starting position curve.

Further, the processor 1001 can invoke the air conditioner control program stored in the memory 1002 and also perform the following operations:
  determining a second preset range according to each preset running time span when the air conditioner has at least two preset running time spans;
  connecting a plurality of starting positions corresponding to each of the second preset ranges to form a starting position curve corresponding to each second preset range;
  marking the starting position curve corresponding to each second preset range according to a target environmental parameter corresponding to each second preset range.

Further, the processor 1001 can invoke the air conditioner control program stored in the memory 1002 and also perform the following operations:
  receiving a response instruction corresponding to the fourth prompt information, and acquiring the starting position curve targeted by the response instruction;
  updating the starting condition of the air conditioner according to the second preset range corresponding to the acquired starting position curve.

Further, the processor 1001 can invoke the air conditioner control program stored in the memory 1002 and also perform the following operations:
  the target operating parameter being determined according to at least one of an operating parameter set by the user, a habitual operating parameter of the user, a district where the air conditioner is located, a group the user belongs, a current time period, a dressing index of users and a current weather parameter.

Further, the processor 1001 can invoke the air conditioner control program stored in the memory 1002 and also perform the following operations:
  determining that the position of the user meets the preset condition, and obtaining an image of the space where the air conditioner is located;
  determining that the space is not closed according to the image, and sending third prompt information that the space where the air conditioner is located is not closed to the mobile terminal, so that the user can determine whether to accept the air conditioner to run in advance based on the mobile terminal;
  receiving third confirmation information, and performing the step of acquiring the target operating parameter of the air conditioner.

Further, the processor 1001 can invoke the air conditioner control program stored in the memory 1002 and also perform the following operations:
  acquiring a change amount of an environmental parameter of the air conditioner in a fourth preset time span;
  determining that the change amount of the environmental parameter is smaller than a preset change amount of the environmental parameter and a difference between the preset change amount of the environmental parameter and the change amount of the environmental parameter is larger than a preset difference value, and increasing an output of the air conditioner;
  the output being cooling energy when the air conditioner runs in a cooling mode, and the output being heating energy when the air conditioner runs in a heating mode.

Further, the processor 1001 can invoke the air conditioner control program stored in the memory 1002 and also perform the following operations:
  the preset change amount of the environmental parameter being determined according to the preset running time span and a value of the environmental parameter corresponding to that the position of the user meets the preset condition.

Further, the processor 1001 can invoke the air conditioner control program stored in the memory 1002 and also perform the following operations:
  determining a distance between the user and the target position according to the current position of the user;
  determining that the distance is greater than a target distance, and controlling the air conditioner to stop, where the target distance is determined according to the preset running time span.

Further, the processor 1001 can invoke the air conditioner control program stored in the memory 1002 and also perform the following operations:
  determining a current moving speed of the user according to information of at least two positions of the user;
  adjusting a cooling energy output or a heating energy output of the air conditioner according to a difference between the current moving speed and a preset moving speed, the difference between the current moving speed and the preset moving speed correlates to the cooling energy output or heating energy output of the air conditioner, and for example, the larger the difference between the current moving speed and the preset moving speed is, the larger the cooling energy output or heating energy output of the air conditioner will be.

Further, the processor 1001 can invoke the air conditioner control program stored in the memory 1002 and also perform the following operations:

acquiring a correspondence relationship between the target environmental parameter of the target position and the position of the user;

sending the correspondence relationship to the mobile terminal for display.

Further, the processor 1001 can invoke the air conditioner control program stored in the memory 1002 and also perform the following operations:

the correspondence relation being displayed in a preset shape, boundary points of the preset shape including the position of the user and constituting a current environmental parameter line, and the preset shape being a circle or a polygon.

Further, the processor 1001 can invoke the air conditioner control program stored in the memory 1002 and also perform the following operations:

in correspondence relationships displayed by the mobile terminal, categories of target environmental parameters corresponding to different correspondence relationships being different, or values of target environmental parameters of a same category corresponding to different correspondence relationships being different.

Further, the processor 1001 can invoke the air conditioner control program stored in the memory 1002 and also perform the following operations:

sending a correspondence relationship corresponding to the current position of the user to the mobile terminal;

or, sending a correspondence relationship corresponding to the target environmental parameter to the mobile terminal, where the target environmental parameter is preset by the user or determined according to a usage habit of the user using the air conditioner.

Further, the processor 1001 can invoke the air conditioner control program stored in the memory 1002 and also perform the following operations:

receiving modification information of the target environmental parameter based on the correspondence relationship, and determining a modified target environmental parameter according to the modification information;

re-determining the target operating parameter and the correspondence relationship according to the position of the user corresponding to the correspondence relationship and the modified target environmental parameter;

sending the re-determined correspondence relationship to the mobile terminal, and controlling the air conditioner to operate according to the re-determined target operating parameter.

Further, the processor 1001 can invoke the air conditioner control program stored in the memory 1002 and also perform the following operations:

determining the target position according to the current time period, the user's schedule or a place input by the user.

Figure 2:
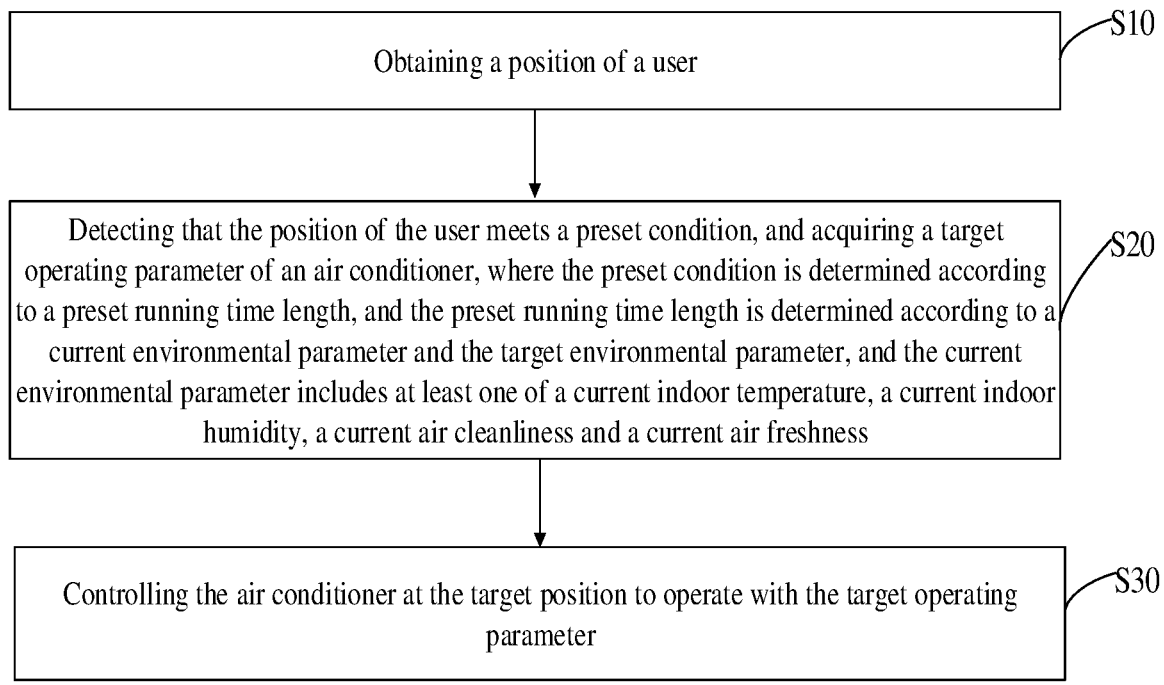
FIG. 2 is a flow diagram of a first embodiment of an air conditioner control method of the present application.

Referring to FIG. 2, in one embodiment, an air conditioner control method includes:

Step S10, obtaining a position of a user.

In this embodiment, a terminal can obtain the position information of the user through a mobile terminal associated with the terminal and carried by the user. Mobile terminals can carry out mobile network positioning through network communication, that is, A-GPS (Assisted GPS Network Assisted GPS Positioning) is positioning through base station information of the mobile phone network and GPS information, and can be used in GSM/GPRS, WCDMA and other networks to obtain current position information of users (such as longitude and latitude data of the users). In this way, mobile terminals that do not always support GPS positioning can also obtain the position information of users in real time.

Step S20, detecting that the position of the user meets a preset condition, and acquiring a target operating parameter of an air conditioner, where the preset condition is determined according to a preset running time span, and the preset running time span is determined according to a current environmental parameter and the target environmental parameter, and the current environmental parameter includes at least one of a current indoor temperature, a current indoor humidity, a current air cleanliness and a current air freshness.

In an embodiment, a starting position is a position to start the air conditioner when the user reaches this position. The target environmental parameter corresponding to the starting position is an actual value of environmental parameter of a space where the air conditioner is located when the user reaches the position of the air conditioner after the air conditioner is started at the starting position.

In an embodiment, the current environmental parameter includes at least one of the current indoor temperature, the current indoor humidity, the current air cleanliness and the current air freshness, and the current environmental parameter is characterized as the current indoor environmental parameter in the space where the air conditioner locates. The current environmental parameter of each category have its corresponding target environmental parameter. Further, the current indoor temperature corresponds to the target indoor temperature, the current indoor humidity corresponds to the target indoor humidity, the current air cleanliness corresponds to the target air cleanliness, and the current air freshness corresponds to the target air freshness.

It should be noted that the air cleanliness is related to the PM2.5 value, the concentration of the formaldehyde $CH_2O$ and other factors. The lower the PM2.5 value and/or concentration of the formaldehyde $CH_2O$ is, the higher the air cleanliness will be. The air freshness is related to the concentration of $CO_2$ in the air. The lower the $CO_2$ concentration is, the higher the air freshness will be.

In an embodiment, the preset condition may be a first preset condition which is a pre-start condition of the air conditioner.

The first preset condition includes at least one of the following: a first time span required to reach the position of the air conditioner from the position of the user's position information being less than or equal to a first preset time span, the distance between the position of the position information of the user and the position of the air conditioner being less than or equal to a first preset distance, a moving direction of the user being determined according to the position information and corresponding to the position of the air conditioner; receiving a pre-start instruction sent from the mobile terminal, where the mobile terminal detects that the position of the user is within the first preset range, or the time span required for the user to reach the target position is less than or equal to the first preset time span, and sends out the pre-start instruction.

The mobile terminal can be loaded with an air conditioner control program, and when the mobile terminal detects that the position of the user is within the first preset range or the first time span required for the user to reach the target position is less than or equal to the first preset time span, the mobile terminal can send the pre-start instruction to the air conditioner, so that the air conditioner determines that the position of the user meets the pre-start condition.

In an embodiment, the first preset range is determined according to the preset running time span, a moving speed of the user, and a route taken by the user to the target position.

In an embodiment, the first preset range includes the target position, the first preset range can be a circle whose center is the target position, and whose radius can be any suitable value. The first preset range can be a polygon, and the distance from each point of the polygon to a target position is the distance between a target location and the target position of the air conditioner.

In an embodiment, upon receiving the position information sent from the mobile terminal, the terminal determines the moving speed of the user (the moving speed can be determined according to information of at least two positions in a period of time), the moving direction of the user (the traveling path of the user can be obtained according to the information of the at least two positions, and the moving direction of the user can be determined according to the traveling path), and the distance between the position of the position information of the user (the current position obtained in real time or fixed times) and the position where the air conditioner is located according to the position information.

In an embodiment, when the first preset condition is that the first time span required to reach the position of the air conditioner from the position of the user's position information is less than or equal to the first preset time span, the first time span can be calculated according to the distance between the position of the user's position information and the position of the air conditioner, and the moving speed of the user. The first preset time span is larger than or equal to the preset running time span with the target environmental parameter corresponding to the starting position, and the preset running time span is the time span required for the current environmental parameter in the space of the air conditioner to reach the corresponding target environmental parameter after the air conditioner is started at the starting position. It should be noted that the first preset time span can be obtained by accumulating the preset running time span and a preset value which can be 0-20 minutes.

In an embodiment, when the first preset condition is that the distance between the position of the user's position information and the position of the air conditioner is less than or equal to the first preset distance, the first preset distance is greater than the distance between the starting position and the position of the air conditioner. It should be noted that the first preset time span can be obtained by accumulating the distance between the starting position and the position of the air conditioner and a preset distance value, and the preset distance value can be calculated according to a preset time value and the moving speed of the user (multiplying the speed by time).

In an embodiment, the target environmental parameters are target values corresponding to the current environmental parameters that make the user feel comfortable. The terminal can obtain the current environmental parameters of the space of the air conditioner and outdoor environmental parameters through the air conditioner. The outdoor environmental parameters include an outdoor temperature and an outdoor humidity. The target environmental parameters can be generated based on the outdoor environmental parameters, the user's historical operation records of operating the air conditioner and at least one of the current environmental parameters. The air conditioner or the server controlling the air conditioner can record the historical operation records of the user operating the air conditioner. The historical operation records include historical operating parameters of the air conditioner, which are associated with current environmental parameters and outdoor environmental parameters when the air conditioner is operating at the historical operating parameters, that is, the historical operating parameters are associated with historical current environmental parameters and historical outdoor environmental parameters. At current when the terminal is to determine the target environmental parameters, the current environmental parameters and the outdoor environmental parameters can be detected first, and then the operating parameters corresponding to the currently detected current environmental parameters and outdoor environmental parameters in the database can be searched and taken as the target environmental parameters. For example, in the historical operation records, when the historical current indoor temperature of the historical current environmental parameters was 29° C., and the historical outdoor temperature of the historical outdoor environmental parameters was 32° C., the user often set the air conditioner to operate with an operating parameter corresponding to "temperature being 24° C.". At this time, when the current indoor temperature is 29° C. and the outdoor environmental temperature is 32° C., "temperature being 24° C." can be obtained as the target environmental parameter corresponding to the current indoor temperature.

In an embodiment, the target environmental parameters can also be set by the user and stored in the server associated with the air conditioner, and the air conditioner can then obtain the target environmental parameters from the server. Of course, the target environmental parameters can also be generated by the terminal according to the current environmental parameters, the outdoor environmental parameters and the historical operation records of the user operating the air conditioner, pushed to the associated mobile terminal for the user to select and confirm, and chose by the user.

In an embodiment, there is a first correspondence relationship between the starting position and the target environmental parameters corresponding to the starting position. After obtaining the target environmental parameters, the terminal can obtain the current environmental parameters and the outdoor environmental parameters, and determine the preset running time span required by the air conditioner to make the current environmental parameters reach the target environmental parameters when the air conditioner operates with the target operating parameters corresponding to the target environmental parameters, according to the current environmental parameters and the outdoor environmental parameters. The target operating parameters corresponding to the target environmental parameters may include at least one of a set temperature, a set humidity, a wind speed, a dust removal mode (such as a negative ion mode for improving the air cleanliness), and a fresh air mode (for improving the air freshness). For example, when the target environmental parameter is "temperature being 25° C.", the corresponding operating parameters can include "the set temperature being 25° C." and "30% wind speed". The path of the user reaching the position of the air conditioner is obtained, and the starting position on the path can be determined according to the moving speed of the user and the preset running time span (the distance obtained by multiplying the speed by the time span is equal to the distance between the starting position and the air conditioner).

It should be noted that the preset running time span can be determined by calculating the preset running time span of the air conditioner according to a calculation formula of the preset running time span of the air conditioner related to the indoor and outdoor environmental parameters. The preset running time span can also be determined by obtaining the historical preset running time spans stored in the database (or the database of the server) which are associated with the historical indoor and outdoor environmental parameters according to the current environmental parameters and the outdoor environmental parameters, searching the historical preset running time span matched with the current indoor and outdoor environmental parameters, and taking the matched historical preset running time span as the preset running time span. In this way, the preset running time span of the air conditioner making the current environmental parameters reach the target environmental parameters can be accurately determined according to the current environmental parameters and the outdoor environmental parameters, which not only can create a comfortable environment for the user, but also avoid energy waste.

In an embodiment, when the terminal obtains the target operating parameters, the terminal associates the target operating parameters with the starting position corresponding to the target environmental parameters.

Step S30, controlling the air conditioner at the target position to operate with the target operating parameter.

The target position is the position where the air conditioner is located. For example, when the user goes to the company, the air conditioner at the target position is a corresponding air conditioner in the user's office. If the user goes home, the air conditioner at the target position is an air conditioner bound with the user's mobile terminal in the home.

When the executive subject is a control terminal or a server of the air conditioner. The position of the user is sent by the mobile terminal to the control terminal or the server. The server or the control terminal judges whether the position of the user meets the preset condition, determines the target operating parameters of the air conditioner at the target position if the position of the user meets the preset condition, and sends the target operating parameters to the air conditioner at the target position, so that the air conditioner cools or heats the target position in advance according to the target operating parameters.

In an embodiment, when the first time span is equal to the first preset time span (or the first distance is equal to the first preset distance), and the first preset time span is equal to the preset running time span, the terminal can control the air conditioner at the target position to operate with the target operating parameters corresponding to the starting position after the target operating parameters are obtained, so that when the user arrives at the position where the air conditioner is located later, the current environmental parameters in the space of the air conditioner can reach the target values corresponding to the target environmental parameters.

In an embodiment, after detecting that the position of the user meets the first preset condition, the terminal may detect that the position of the user also meets the second preset condition, then the terminal executes step S30.

In an embodiment, the preset condition may include a second preset condition, and the second preset condition is a starting condition of the air conditioner.

In an embodiment, since the distance between the user and the position of the air conditioner and the first time span are constantly changed on the way home, the terminal can update the first time span and the distance between the position of the user's position information and the position of the air conditioner in real time.

In an embodiment, the second preset condition includes at least one of the following: a first time span required to reach the position of the air conditioner from the position of the user's position information being less than or equal to a second preset time span less than the first preset time span, a second distance between the position of the user's position information and the position of the air conditioner being less than or equal to a second preset distance less than the first preset distance, receiving a starting instruction sent from the mobile terminal, where the mobile terminal detects that the position of the user is within the second preset range, or that the time span required for the user to reach the target position is less than or equal to the second preset time span, and sends out the starting instruction.

Optionally the second preset time span can be the preset running time span, and the second preset distance can be the distance between the starting position and the position of the air conditioner. Thus, when the user arrives at the starting position (that is, the position of the position information is the starting position), the position information of the user can be determined to meet the second preset condition.

In an embodiment, the second preset range is determined according to the preset running time span, the moving speed of the user, and the route of the user to the target position. The second preset range includes a second target location, and the second preset range can be a circle whose center is the second target location, and whose radius can be any suitable value. The second preset range can be a polygon, and the distance from each point of the polygon to the target position is the distance between the second target location and the target position of the air conditioner.

The mobile terminal can be loaded with an air conditioner control program, and when the mobile terminal detects that the position of the user is within the second preset range or the time span required for the user to reach the target position is less than or equal to the second preset time span, the mobile terminal can send a starting instruction to the air conditioner, so that the air conditioner determines that the position of the user meets the starting condition.

It should be noted that the route and the moving speed are determined according to at least one of a travel way of the user and road condition information corresponding to a current time period.

When the position information of the user is detected to meet the second preset condition, the air conditioner is controlled to operate with the target operating parameters corresponding to the starting position, so that when the user arrives at the position of the air conditioner later, the current environmental parameters in the space of the air conditioner can reach the target values corresponding to the target environmental parameters.

In an embodiment, the position of the user is acquired, and it is detected that the position of the user meets the preset condition, and then the target operating parameters of the air conditioner are acquired. The preset condition is determined according to the preset running time span, the preset running time span is determined according to the current environmental parameters and the target environmental parameters, and the current environmental parameters include at least one of the current indoor temperature, the current indoor humidity, the current air cleanliness and the current air freshness, the air conditioner of the target position is controlled to operate with the target operating parameters. In this way, users can enjoy a comfortable environment as soon as they enter the room, and at the same time it avoids wasting electric energy caused by starting the air conditioner too early, thereby realizing that the air conditioner can create a comfortable environment for the user under the condition of effectively saving energy.

Figure 3:
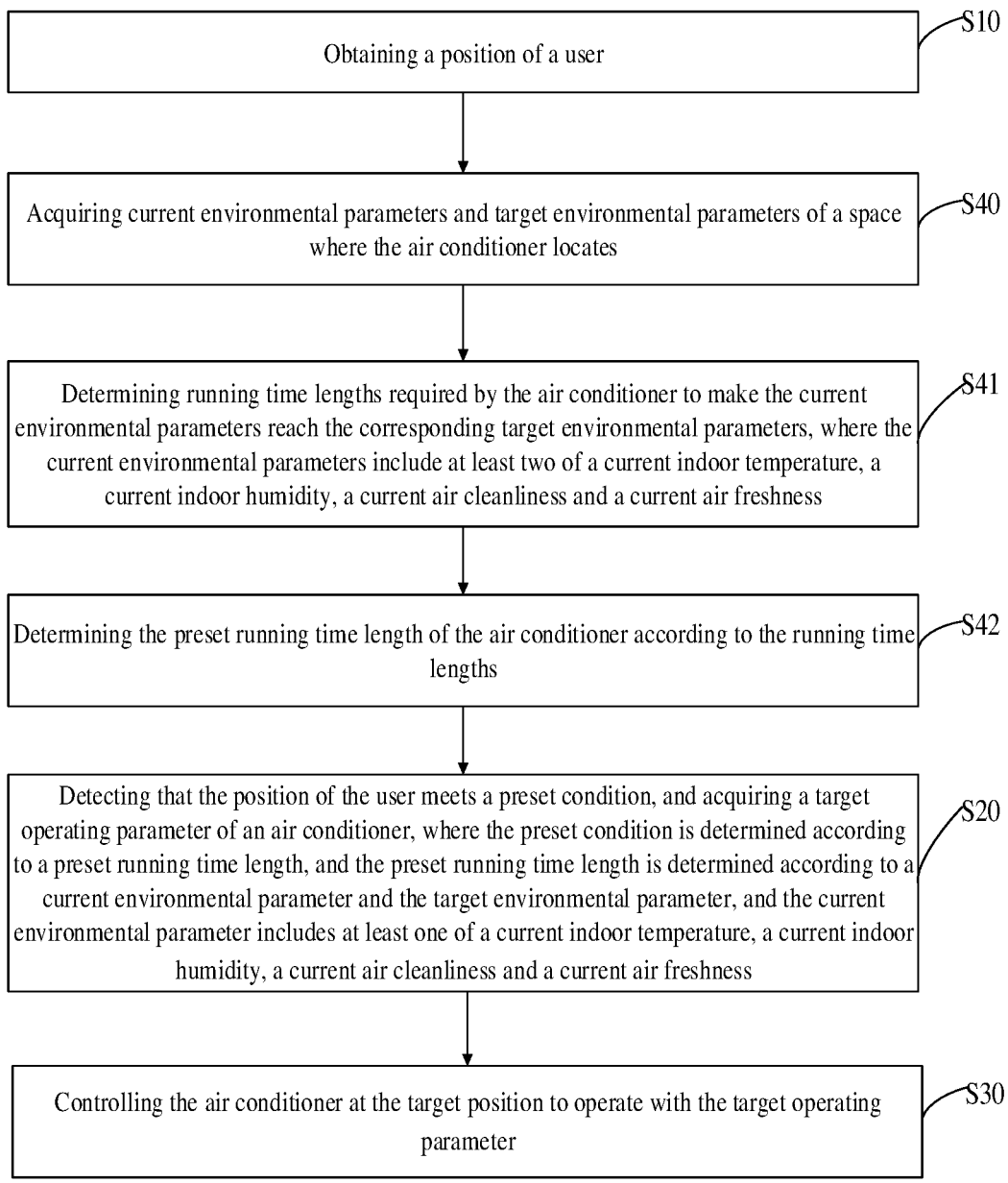
FIG. 3 is a flow diagram of a second embodiment of the air conditioner control method of the present application.

In a second embodiment, as shown in FIG. 3, on the basis of the embodiment shown in FIG. 2, before the step of detecting that the position of the user meets the preset condition, and acquiring the target operating parameter of the air conditioner, the method further includes:

Step S40, acquiring current environmental parameters and target environmental parameters of a space where the air conditioner locates.

Step S41, determining running time spans required by the air conditioner to make the current environmental parameters reach the corresponding target environmental parameters, where the current environmental parameters include at least two of a current indoor temperature, a current indoor humidity, a current air cleanliness and a current air freshness.

Step S42, determining the preset running time span of the air conditioner according to the running time spans.

In an embodiment, the terminal executes steps S40 to S42 before step S30.

In an embodiment, the terminal obtains various current environmental parameters of the space of the air conditioner in advance and the target environmental parameters corresponding to the current environmental parameters.

When the terminal acquires at least two current environmental parameters (i.e., the current environmental parameters include at least two of the current indoor temperature, the current indoor humidity, the current air cleanliness and the current air freshness), the terminal determines each running time span required by the air conditioner to make each of the current environmental parameters preferentially reach its corresponding target environmental parameter.

For example, the current environmental parameters acquired by the terminal include the current indoor temperature and the current indoor humidity, and the target indoor temperature corresponding to the current indoor temperature and the target indoor humidity corresponding to the current indoor humidity. Then the terminal calculates the running time span required for the current indoor temperature to preferentially reach the target indoor temperature and the running time span required for the current indoor humidity to preferentially reach the target indoor humidity in the process of the air conditioner performing both cooling output and humidification output.

In this way, the terminal can get the required running time span for each current environmental parameter to reach its corresponding target environmental parameter, and associate the running time span with the target environmental parameter.

Further, the terminal determines the preset running time span of the air conditioner according to the running time span corresponding to each target environmental parameter.

In an embodiment, when to determine the preset running time span, the terminal can select the running time span corresponding to the target environmental parameter with the highest priority from the running time spans corresponding to all the target environmental parameters, and take the selected running time span as the preset running time span. It should be understood that the priority level corresponding to each of the target environmental parameters may be preset by the user or the engineer preparing the air conditioner.

In an embodiment, the target indoor temperature is preset as be of the first rank, the target air cleanliness is preset as be of the second rank, the target indoor humidity is preset as be of the third rank, the target air freshness is preset as be of the fourth rank, and the first rank is the highest rank.

In an embodiment, when to determine the preset running time span, the terminal can obtain the longest one of all the running time spans corresponding to the target environmental parameters as the preset running time span.

In an embodiment, when to determine the preset running time span, the terminal can calculate an average of all the running time spans corresponding to the target environmental parameters, and take the calculated average as the preset running time span.

In an embodiment, when to determine the preset running time span, the terminal can take all the running time spans corresponding to the target environmental parameters as the preset running time span.

In an embodiment, when the terminal determines that there are a plurality of preset running time spans, the terminal can send a second prompt information for modifying the operating parameters of the air conditioner to the mobile terminal pre-designated by the user when the position of the user meets the first preset condition, and the second prompt information may be generated according to all the preset running time spans. After receiving the second prompt information, the mobile terminal can select a preset running time span to generate a second confirmation information and send the second confirmation information to the terminal. The terminal receives the second confirmation information sent from the mobile terminal, acquires a modified operating parameter (i.e. the operating parameter corresponding to the selected preset running time span) according to the second confirmation information, and changes the modified operating parameter to be a target operating parameter.

In an embodiment, the current environmental parameters and the target environmental parameters of the space of the air conditioner are obtained, the running time spans required by the air conditioner to make the current environmental parameters reach the corresponding target environmental parameters are determined, where the current environmental parameters includes at least two of the current indoor temperature, the current indoor humidity, the current air cleanliness and the current air freshness, and the preset running time span of the air conditioner is determined according to the running time spans. In this way, the determination of the preset running time span is realized.

Figure 4:
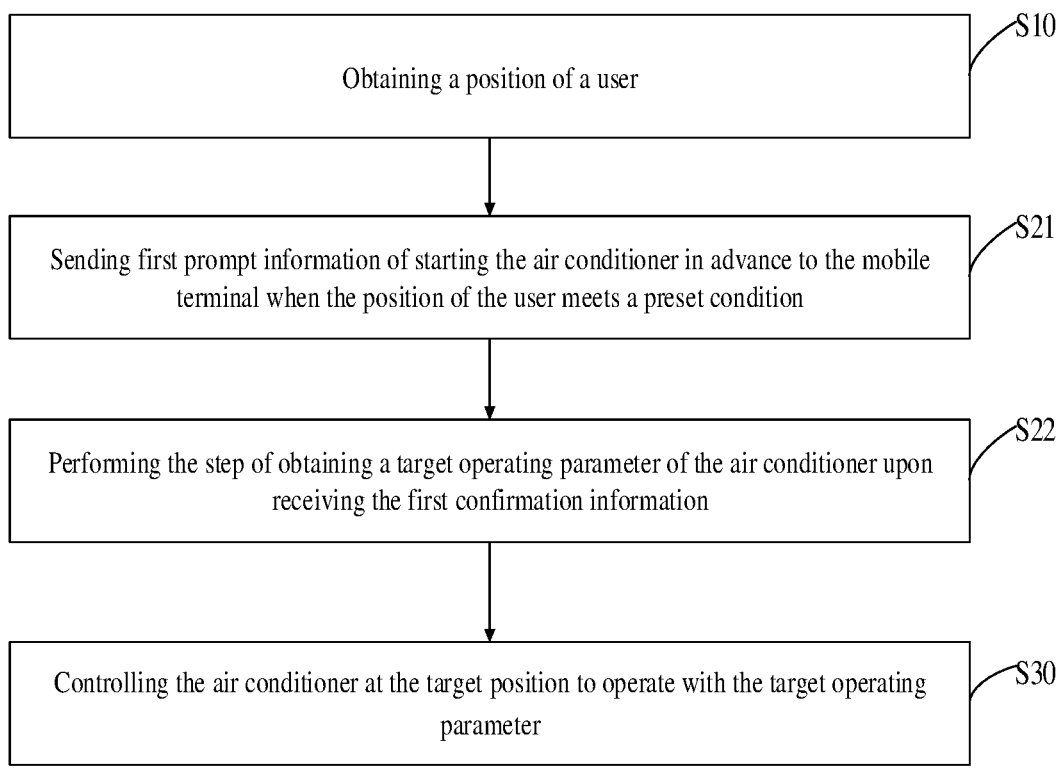
FIG. 4 is a flow diagram of a third embodiment of the air conditioner control method of the present application.

In a third embodiment, as shown in FIG. 4, based on the above-described embodiments of FIGS. 2 and 3, the air conditioner control method includes:

Step S21, sending first prompt information of starting the air conditioner in advance to the mobile terminal when the position of the user meets a preset condition;

Step S22, performing the step of obtaining a target operating parameter of the air conditioner upon receiving the first confirmation information.

In this embodiment, the terminal outputs prompt information to the mobile terminal carried by the user according to the acquired starting position and the target environmental parameters corresponding to the starting position, to prompt the user if the air conditioner is started and controlled to run with the target operating parameters corresponding to the target environmental parameters when the user arrives at the starting position, the current environmental parameters in the space of the air conditioner can reach the corresponding target environmental parameters when the user arrives at the position of the air conditioner.

In an embodiment, when the terminal receives a confirmation response sent from the user based on the prompt information, the terminal determines that the first confirmation information has been received, or when the terminal does not receive a refusal response sent based on the prompt information, the terminal continues to execute Step S30. If the terminal receives a refusal response from the user based on the prompt information, the terminal no longer executes Step S30 and does not control the air conditioner to perform pre-start.

In an embodiment, when the terminal receives the first confirmation information and detects that the position of the user meets the starting condition of the air conditioner, the terminal performs the step of obtaining the target operating parameter of the air conditioner. Otherwise, the terminal does not perform the step of acquiring the target operating parameter of the air conditioner.

In this way, the air conditioner can be controlled to start when the user needs to use the air conditioner.

Figure 5:
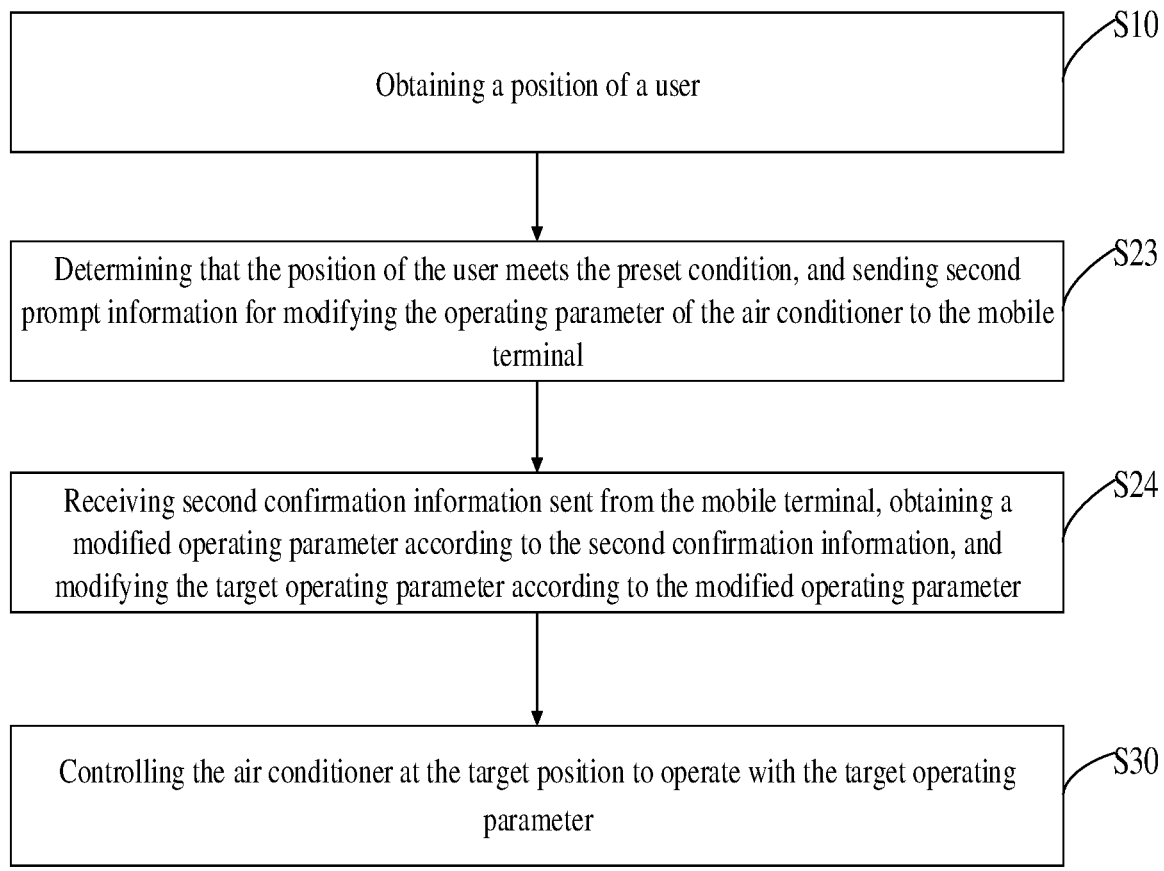
FIG. 5 is a flow diagram of a fourth embodiment of the air conditioner control method of the present application.

In a fourth embodiment, as shown in FIG. 5, based on the above-described embodiments of FIG. 2 to FIG. 4, the air conditioner control method includes:

Step S23, determining that the position of the user meets the preset condition, and sending second prompt information for modifying the operating parameter of the air conditioner to the mobile terminal;

Step S24, receiving second confirmation information sent from the mobile terminal, obtaining a modified operating parameter according to the second confirmation information, and modifying the target operating parameter according to the modified operating parameter.

In this embodiment, the target operating parameters may be default operating parameters or operating parameters set by the user. However, the default operating parameters or the operating parameters set by the user may not meet the current pre-cooling or pre-heating wishes of the user. In this regard, when the position of the user meets the pre-start condition, the air conditioner transmits prompt information for modifying the operating parameters of the air conditioner to the mobile terminal, and the preset condition includes the pre-start condition.

After viewing the prompt information, the user can enter an interface of the air conditioner control program of the mobile terminal to modify the operating parameters. The air conditioner can send the operating parameters to the mobile terminal together with the prompt information, so that the user can know the current operating parameters of the air conditioner after viewing the prompt information, and then decide whether to modify the operating parameters.

When the air conditioner receives the second confirmation information, the air conditioner can obtain the modified operating parameters according to the second confirmation information, and then takes the modified operating parameters as the target operating parameters.

If the second confirmation information is not received within a preset time span, it can determine that the user does not need to modify the operating parameters, and the current operating parameters are taken as the target operating parameters at this time, or if a refusal information is received within the preset time span, the current operating parameters are also taken as the target operating parameters. The preset time span is a third preset time span, which can be any suitable value less than the time span for the user to reach the starting position of the air conditioner from his current position.

In the technical solution provided by this embodiment, the air conditioner sends the prompt information of modifying the operating parameters of the air conditioner to the mobile terminal after judging that the position of the user meets the pre-start condition, so that the air conditioner operates according to the operating parameters conforming to the user's wishes.

In an embodiment, the route of the user to the target location can be determined according to at least one of the travel way of the user and the road condition information corresponding to the current time period.

For example, the travel way for the user to go to the target position can be cycling or taking a bus, and the routes corresponding cycling and taking a bus are different, and the mobile terminals are also different.

When the travel way is walking, there is no need to consider the road condition information of the current time period. When the travel way is taking a bus, the moving speed is affected by the road condition information of the current time period. If the road condition information shows congestion, the actual moving speed will be less than the original predetermined speed.

The air conditioner can be associated with a server of a navigation software, for example, with a server of Baidu Map. When the user uses Baidu Map, he will select a route, and Baidu Map pushes the road condition information corresponding to the route and the route to the server of the air conditioner, so that the server of the air conditioner sends the road condition information to the air conditioner, and the air conditioner can determine the moving speed and the travel way of the user according to the route information and route.

Of course, the user can input the travel way to the target position in the air conditioner control program, and the air conditioner can determine the moving speed of the user according to the travel way and the habitual route of the user to the target position through the travel way, and can obtain the road condition information of the habitual route from the associated navigation server.

In an embodiment, the air conditioner determines the route of the user to the target position and the moving speed according to at least one of the travel way of the user and the road condition information at the current time period, so as to accurately judge whether the position of the user meets the preset conditions.

In an embodiment, the target operating parameters are determined according to at least one of the operating parameters set by the user, the habitual operating parameters corresponding to the user, the district where the air conditioner is located, the group the user belongs, the current time period, the dressing index of users and the current weather parameters.

For example, the user can set the operating parameters on the air conditioner. The operating parameters can be the target operating parameters. When the user does not set the operating parameters on the air conditioner, the air conditioner can determine the target operating parameters according to at least one of the habitual operating parameters corresponding to the user, the district where the air conditioner is located, the group the user belongs, the current time period, the dressing index of users and the current weather parameter.

The server obtains the operating parameters of the air conditioner when it is running, and classifies the operating parameters. For example, the operating parameters belonging to the same district fall in one category, the operating parameters of air conditioners whose users belongs to the same group fall in one category, the operating parameters in the same time period fall in one category, the operating parameters with the dressing indexes of users in the same range fall in one category, and the operating parameters with the same weather parameter fall in one category. The dressing indexes refer to the numbers of clothes worn by users and the thicknesses of clothes, etc. The server takes and stores the operating parameters with the largest proportion of each category as the corresponding operating parameters of this category.

When the user uses the air conditioner, the air conditioner will record the user's operation record, so as to determine the user's habitual operation data, and then determine the habitual operating parameters according to the habitual operation data.

When the user does not set the operating parameters of the air conditioner. The air conditioner can determine the target operating parameters from one or more of the habitual operating parameters corresponding to the user, the operating parameters corresponding to the district where the air conditioner is located, the group the user belongs, the current time period, the dressing index of users or the current weather parameter. If there are many kinds of operating parameters, the target operating parameters are obtained by weighting calculation of all kinds of the operating parameters.

Figure 6:
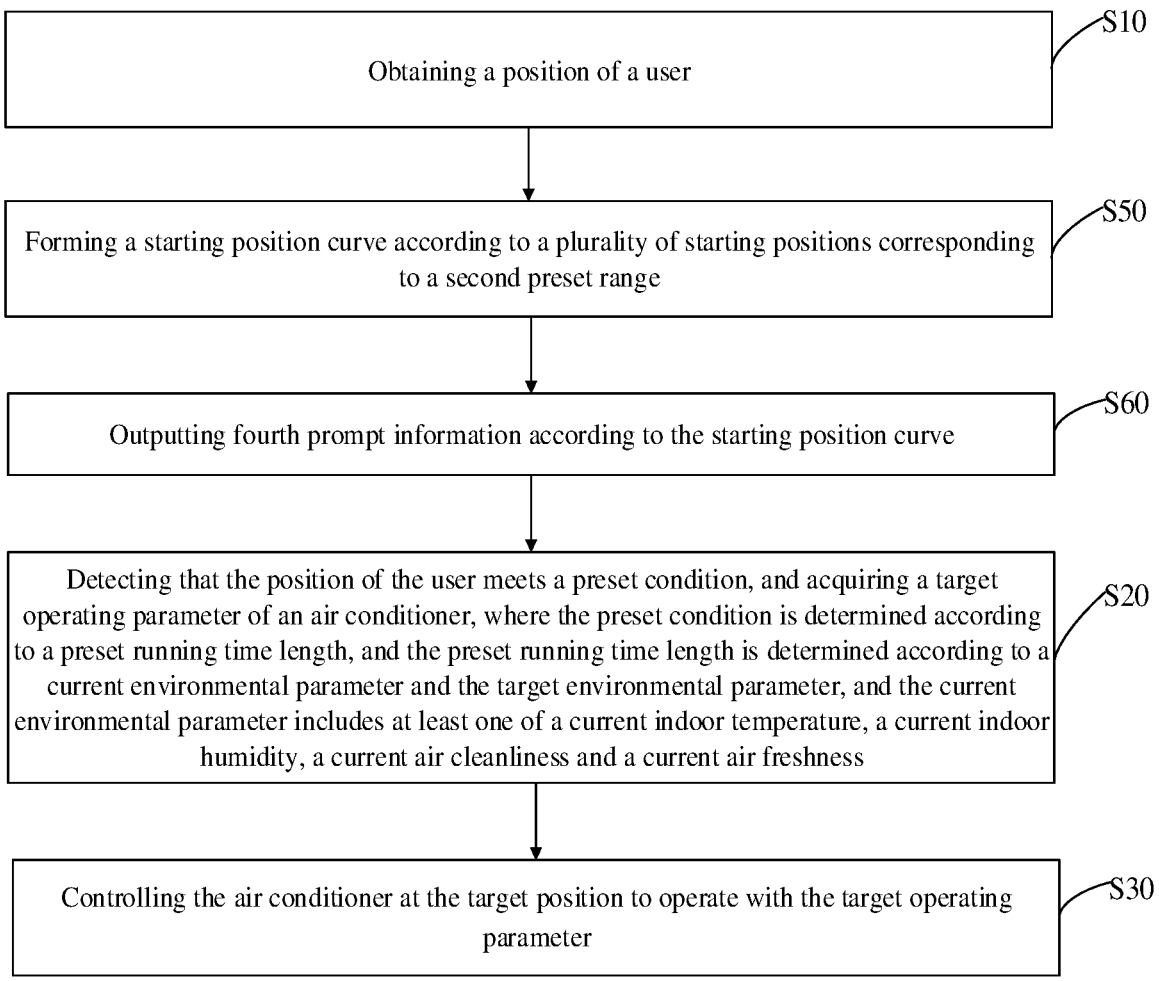
FIG. 6 is a flow diagram of a fifth embodiment of the air conditioner control method of the present application.

In a fifth embodiment, as shown in FIG. 6, on the basis of the above-mentioned embodiments of FIG. 2 to FIG. 5, before the step of detecting that the position of the user meets the preset condition, and acquiring the target operating parameters of the air conditioner, the method further includes:

step S50, forming a starting position curve according to a plurality of starting positions corresponding to the second preset range.

Step S60, outputting fourth prompt information according to the starting position curve.

In this embodiment, the second preset range can correspond to a plurality of starting positions. When the terminal obtains the target environmental parameters, the terminal determines the preset running time span corresponding to the target environmental parameters. Then, the terminal obtains all possible routes for the user to reach the position of the air conditioner. The second preset range is determined according to the moving speed of the user and the preset running time span. At the same time, a plurality of starting positions (the distance obtained by multiplying the speed by the time span is equal to the distance between each of the starting position and the air conditioner) are determined on the plurality of routes, and the starting positions are located at the boundary of the second preset range.

Further, the terminal connects all the starting positions corresponding to the second preset range to obtain the starting position curve.

It should be noted that there are many routes for users to go to the position of the air conditioner, and the routes are different. For example, route A has a turn, while route B does not have a turn. When the times to reach the target position are the same, the distances between the user and the target position are different.

In an embodiment, the terminal outputs the fourth prompt information to the mobile terminal carried by the user according to the starting position curve, to prompt the user that the indoor temperature in the space of the air conditioner can reach the target indoor temperature when the user arrives at the position of the air conditioner, if the air conditioner is started when the user arrives at a starting position, and controlled to operate with the target operating parameter corresponding to the target indoor temperature.

At this time, the terminal can combine the starting position curve with the map application, display the starting position curve connecting the plurality of starting positions on the map, and mark the corresponding target environmental parameter beside the starting position curve, which is output to the user's mobile terminal as the fourth prompt information and displayed, so that the user can intuitively know the distance relationship between his current position and the starting position curve in the map application.

In an embodiment, the starting position curve can be selected as a circular curve or a polygonal curve, when the user starts from any boundary point (starting position) of the curve, the time span required for reaching the target position is the same. The following takes the starting position curve as a circular curve as an example.

It should be noted that the starting position curve can be a circular curve, that is, the distance calculated according to the moving speed of the user and the preset running time span is taken as the radius, and the position of the air conditioner is taken as the center of the circle to generate the circular curve, any point on the edge of the circle is a starting position corresponding to the second preset range. As long as the user arrives at the edge of the circle, it can be determined that the position of the user's position information is at a starting position.

In an embodiment, in order to facilitate users to know the target environmental parameters, the corresponding target environmental parameters can also be marked on the starting position curve. It should be noted that the starting position curve has its corresponding second area range, the second area range has its corresponding preset running time span, and the preset running time span has its corresponding target environmental parameters.

Figure 7:
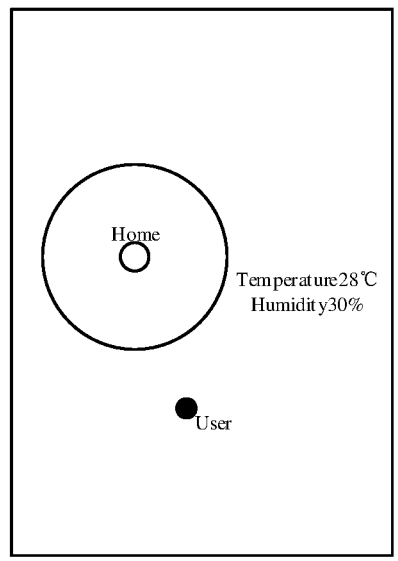
FIG. 7 is an exemplary diagram of a fourth prompt information according to an embodiment of the air conditioner control method of the present application.

In an embodiment, referring to FIG. 7, the fourth prompt information having the starting position curve which is marked with corresponding target environmental parameters is generated and output to the mobile terminal carried by the user (such as a navigator on a car being driven by the user). For example, if the starting position curve corresponds to an adjustable current indoor temperature and an adjustable current indoor humidity, the target environmental parameters identified by the starting position curve include the target indoor temperature and the target indoor humidity.

Of course, if the air conditioner only adjusts one environmental parameter at present, the starting position curve can only display said environmental parameter. For example, if the air conditioner only adjusts the current indoor temperature, the starting position curve can only be marked with the target indoor temperature.

Of course, if the air conditioner can adjust all the environmental parameters at present, the starting position curve can be marked with the corresponding target indoor temperature, target indoor humidity, target air cleanliness and target air freshness.

In an embodiment, the starting position curve can also be marked with a preset running time span corresponding to the starting position curve, so that the user can conveniently know the running time span the air conditioner will spend after the air conditioner is self-started at the time of the user reaching a physical position corresponding to the starting position curve.

In an embodiment, by outputting the prompt information with the starting position curve, the user can figuratively know the distance relationship between his current position and the starting position curve on the map application, thereby improving the human-computer interaction experience of the user.

Figure 8:
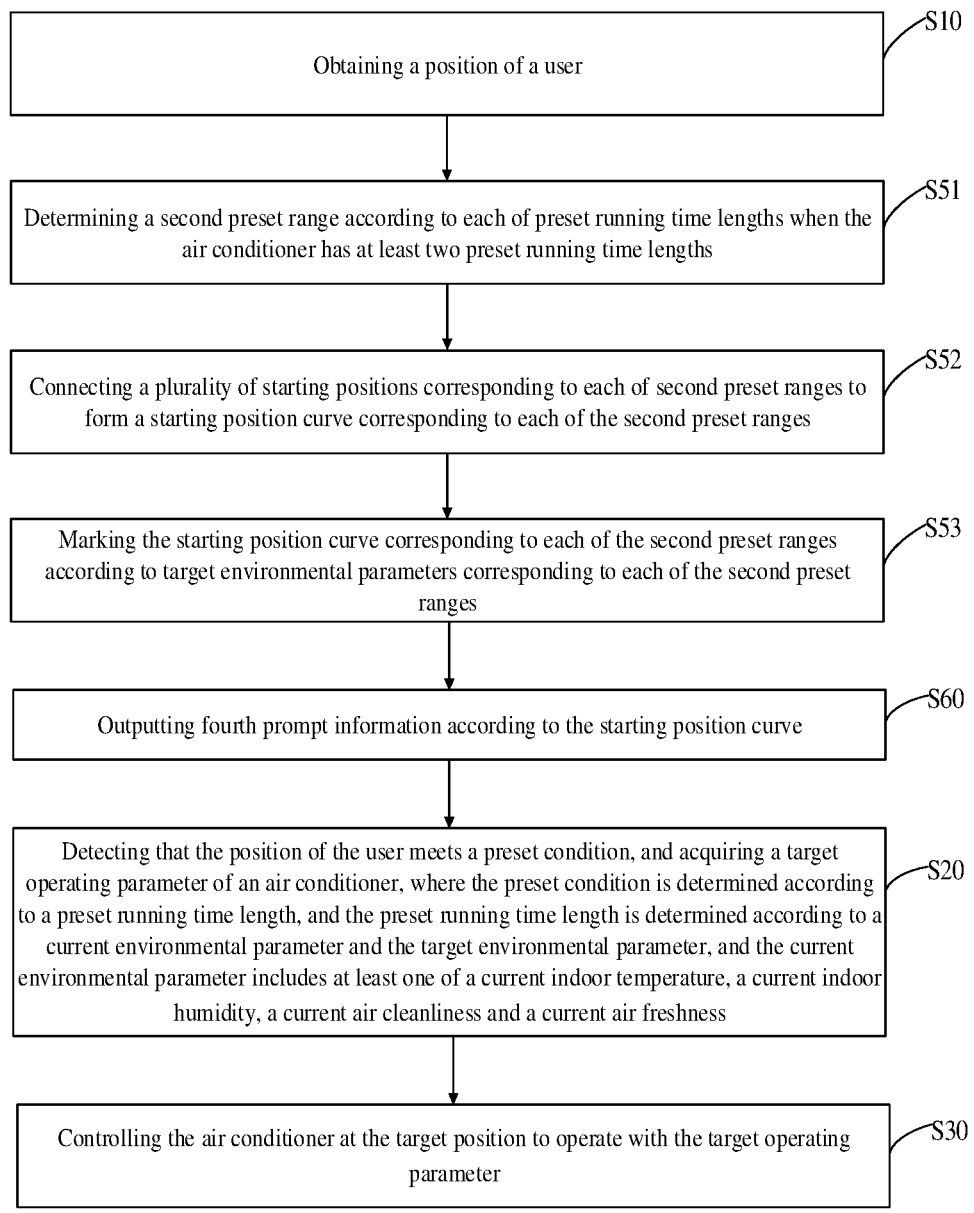
FIG. 8 is a flow diagram of a sixth embodiment of the air conditioner control method of the present application.

In a sixth embodiment, as shown in FIG. 8, based on the above-mentioned embodiments of FIG. 2 to FIG. 7, the step of forming a starting position curve according to a plurality of starting positions corresponding to the second preset range includes:

Step S51, determining a second preset range according to each of preset running time spans when the air conditioner has at least two preset running time spans.

Step S52, connecting a plurality of starting positions corresponding to each of second preset ranges to form the starting position curve corresponding to each of the second preset ranges.

Step S53, marking the starting position curve corresponding to each of the second preset ranges according to target environmental parameters corresponding to each of the second preset ranges.

In an embodiment, when there are at least two preset running time spans of the air conditioner, the terminal determines the corresponding second preset range according to each preset running time span. Then, a plurality of starting positions corresponding to each second preset range are connected to form a starting position curve corresponding to each second preset range, and the starting position curve corresponding to each second preset range is marked according to the target environmental parameters corresponding to each second preset range.

Figure 9:
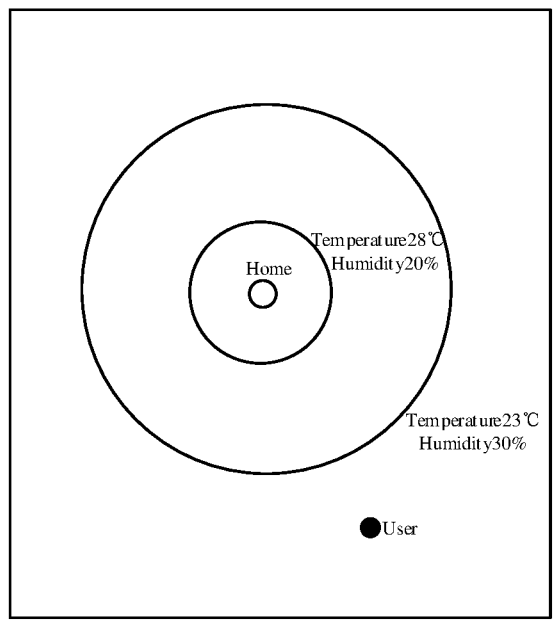
FIG. 9 is an exemplary diagram of multiple starting position curves according to an embodiment of the air conditioner control method of the present application.

Further, as shown in FIG. 9, the terminal can generate the fourth prompt information including a plurality of starting position curves and corresponding target environmental parameters, and output the fourth prompt information to the mobile terminal of the user.

In an embodiment, when the fourth prompt information includes a plurality of starting position curves, the user can select a desired starting position curve (i.e., click the starting position curve) on the mobile terminal and send it to the terminal. At this time, the terminal determines that the response instruction corresponding to the fourth prompt information is received. Then the terminal updates the starting condition of the air conditioner according to the second preset range corresponding to the acquired starting position curve, and judges whether the position of the user meets the updated second preset range based on the updated starting condition.

At the same time, the terminal obtains the target environmental parameters corresponding to the updated second preset range, and updates the operating parameters corresponding to the target environmental parameters to be the target operating parameters. When the user position reaches the updated second preset range, the terminal controls the air conditioner at the target position to operate according to the updated target operating parameters.

In an embodiment, by outputting the prompt information with the starting position curve, the user can figuratively know the distance relationship between the current position and the starting position curve on the map application, thereby improving the human-computer interaction experience of the user, and at the same time, facilitating the user to select the desired target environmental parameters.

Figure 10:
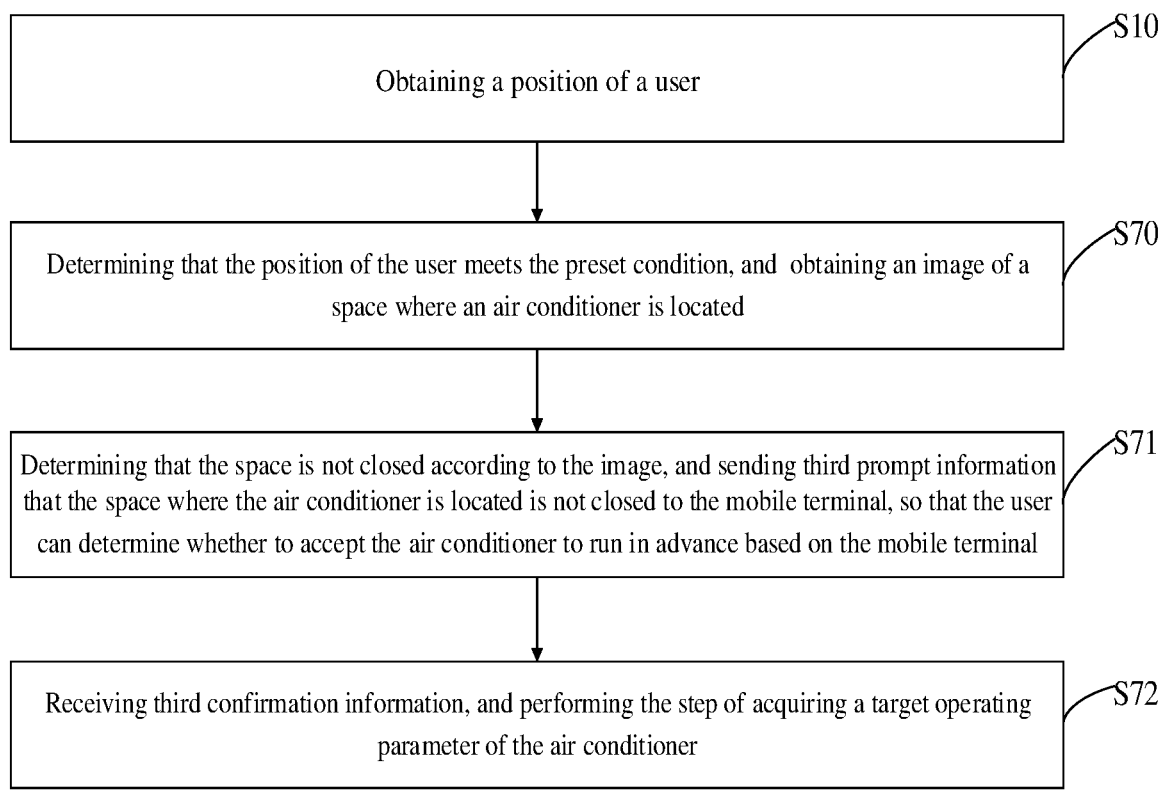
FIG. 10 is a flow diagram of a seventh embodiment of the air conditioner control method of the present application.

In a seventh embodiment, as shown in FIG. 10, after the step of acquiring a position of the user on the basis of the above-described embodiments of FIG. 2 to FIG. 9, the method further includes:

Step S70, determining that the position of the user meets the preset condition, and obtaining an image of a space where the air conditioner is located.

Step S71, determining that the space is not closed according to the image, and sending third prompt information that the space where the air conditioner is located is not closed to the mobile terminal, so that the user can determine whether to accept the air conditioner to run in advance based on the mobile terminal;

Step S72, receiving third confirmation information, and performing the step of acquiring the target operating parameter of the air conditioner.

In an embodiment, the air conditioner is provided with an image acquisition module, which can be a camera or a video camera. The image acquisition module can be connected with a rotating mechanism, and the air conditioner controls the image acquisition module to rotate by driving the rotating mechanism, so as to obtain a global image of the space of the air conditioner.

The air conditioner can determine whether the space is closed according to the image. If the space where the air conditioner is located is not closed, the energy consumption of the air conditioner is large. At this time, the prompt information that the space where the air conditioner is located is not closed is sent to the mobile terminal for the user to determine whether to accept the air conditioner to run in advance based on the mobile terminal.

Upon receiving the third confirmation information, the air conditioner can determine that the user agrees to precooling or preheating the space by the air conditioner. At this time, the air conditioner executes Steps S20 and S30. If the air conditioner does not receive the confirmation information sent from the mobile terminal, or receives refusal information sent from the mobile terminal, the air conditioner stops precooling or preheating.

In the technical solution provided by this embodiment, when the position of the user meets the preset condition, the air conditioner detects whether the space of the air conditioner is in a closed state, and if the space is not in the closed state, the air conditioner prompts the user whether to agree with the advance operation of the air conditioner, thereby improving the user experience.

Figure 11:
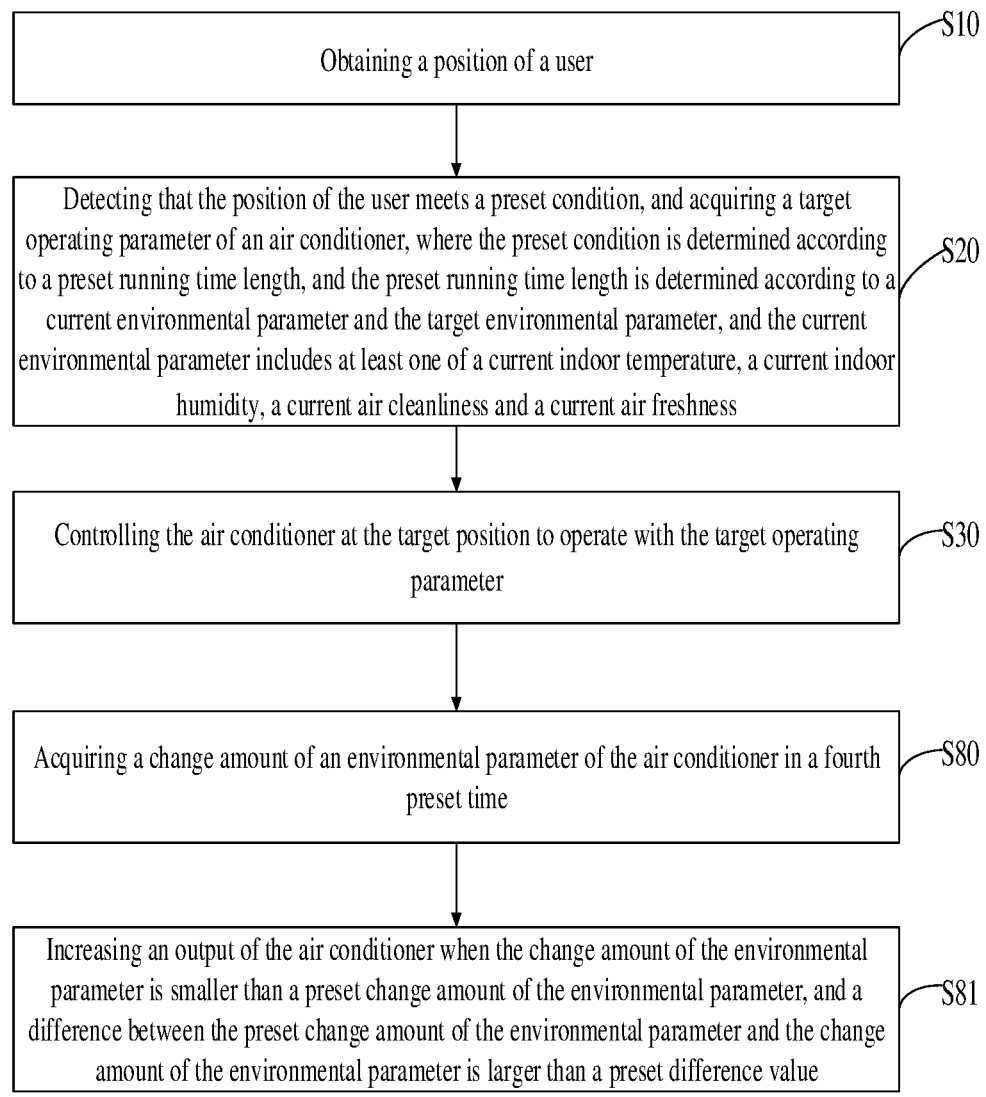
FIG. 11 is a flow diagram of an eighth embodiment of the air conditioner control method of the present application.

In an eighth embodiment, as shown in FIG. 11, following the step of controlling the air conditioner to operate with the target operating parameter, on the basis of the above-described embodiments of FIGS. 2 to 10, the method further includes:

Step S80, acquiring a change amount of an environmental parameter of the air conditioner in a fourth preset time span.

Step S81, increasing an output of the air conditioner when the change amount of the environmental parameter is smaller than a preset change amount of the environmental parameter, and a difference between the preset change amount of the environmental parameter and the change amount of the environmental parameter is larger than a preset difference value.

In this embodiment, when the air conditioner runs in a cooling mode, the output is a cooling output; and when the air conditioner runs in a heating mode, the output is the heating output.

In an embodiment, when the air conditioner runs, the change amount of the environmental parameter can be obtained in real time, and the change amount of the environmental parameter can be the change amount of the indoor temperature. The air conditioner can obtain the change amount of the environmental parameter within a fourth preset time span which can be any suitable value, for example, 2 min.

The air conditioner stores a preset change amount of the environmental parameter, and a time span corresponding to the preset change amount of the environmental parameter is equal to the fourth preset time span. The air conditioner compares the change amount of environmental parameter with the preset change amount of the environmental parameter. When the change amount of the environmental parameter is less than the preset change amount of the environmental parameter, it indicates that the current cooling rate of the air conditioner (it is the cooling rate when the air conditioner cools) or the heating rate (it is the heating rate when the air conditioner heats) fluctuates. If the difference between the change amount of the environmental parameter and the preset change amount of the environmental parameter is greater than a preset difference value, it indicates the fluctuation is abnormal. At this time, it is necessary to control the air conditioner to increase the output of cooling or heating. The increased amount of cooling and heating can be determined according to the difference between the preset change amount of the environmental parameter and the change amount of the environmental parameter.

In addition, the change amount of the preset environmental parameter can be determined according to the time span for the temperature to reach the target temperature, the environmental parameter when the user's position meets the preset condition, and the target environmental parameter. For example, the air conditioner calculates a difference between the target environmental parameter and the environmental parameter, and the air conditioner generally has a uniform heating speed for the indoor space. Therefore, the difference between the target environmental parameter and the environmental parameter is divided by the time span for the temperature to reach the target temperature to obtain the change amount of the environmental parameter per unit time, and the change amount of the environmental parameter per unit time multiplied by the fourth preset time span is the preset change amount of the environmental parameter.

In this way, when the user reaches the target position, the air conditioner can make the indoor environment to be comfortable expected by the user as soon as possible.

Figure 12:
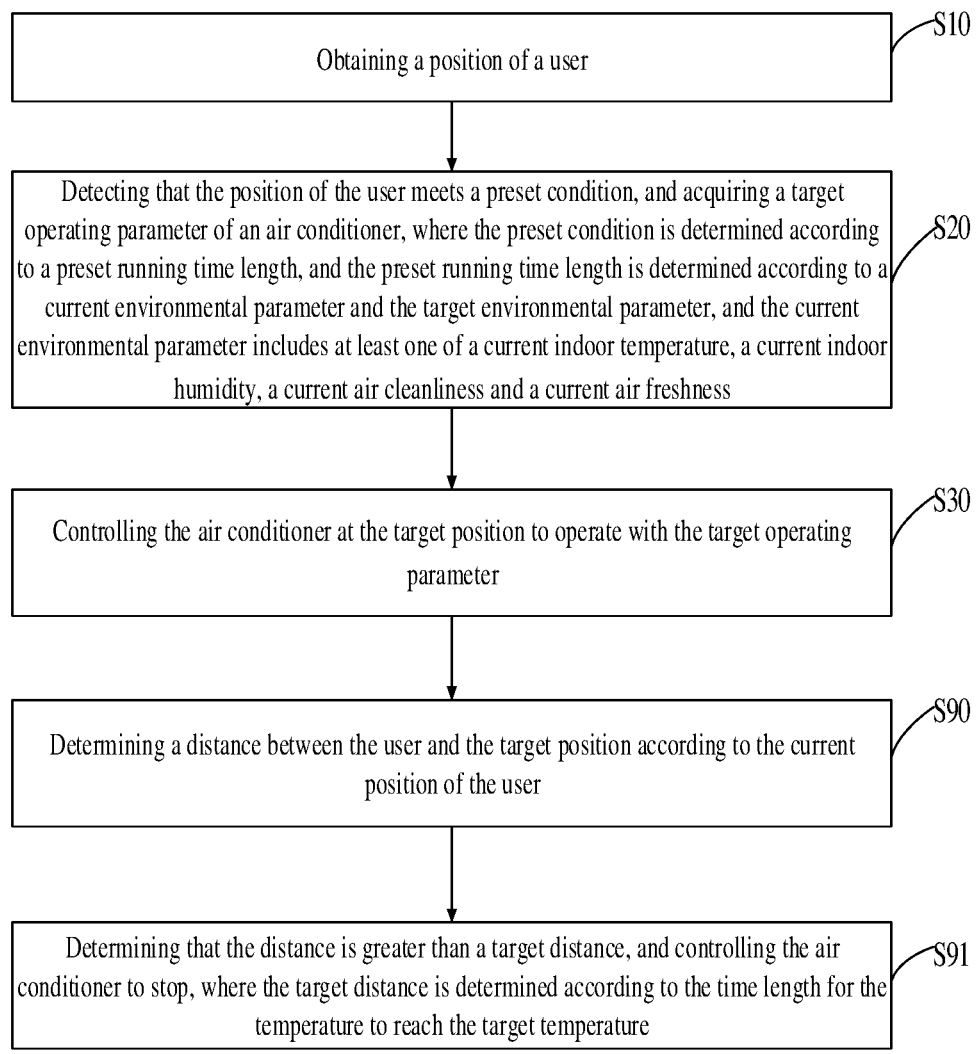
FIG. 12 is a flow diagram of a ninth embodiment of the air conditioner control method of the present application.

In a ninth embodiment, as shown in FIG. 12, following the step of controlling the air conditioner to operate with the target operating parameter, on the basis of the above-described embodiments of FIG. 2 to FIG. 11, the method further includes:

Step S90, determining a distance between the user and the target position according to the current position of the user.

Step S91, determining that the distance is greater than a target distance, and controlling the air conditioner to stop, where the target distance is determined according to the time span for the temperature to reach the target temperature.

In this embodiment, after the air conditioner is operated, the user may change the target position. For example, the key is left in the office when the user goes home, and the user has to return to the office. Therefore, after the air conditioner is operated, the distance between the user's position and the target position is acquired in real time. When the distance is larger than the target distance, it determines that the user changes the target position, and at this time, the air conditioner is controlled to stop. The target distance is determined according to the time span for the temperature to reach the target temperature, and the target distance is the distance between the place when the air conditioner is started and the target position. The determination of the place when the target air conditioner is started will not be repeated here.

In the technical solution provided by this embodiment, the air conditioner determines the distance between the user's position and the target position. When the distance is greater than the target distance, the air conditioner determines that the user has changed the target position. At this time, the air conditioner stops to save the energy consumption.

Figure 13:
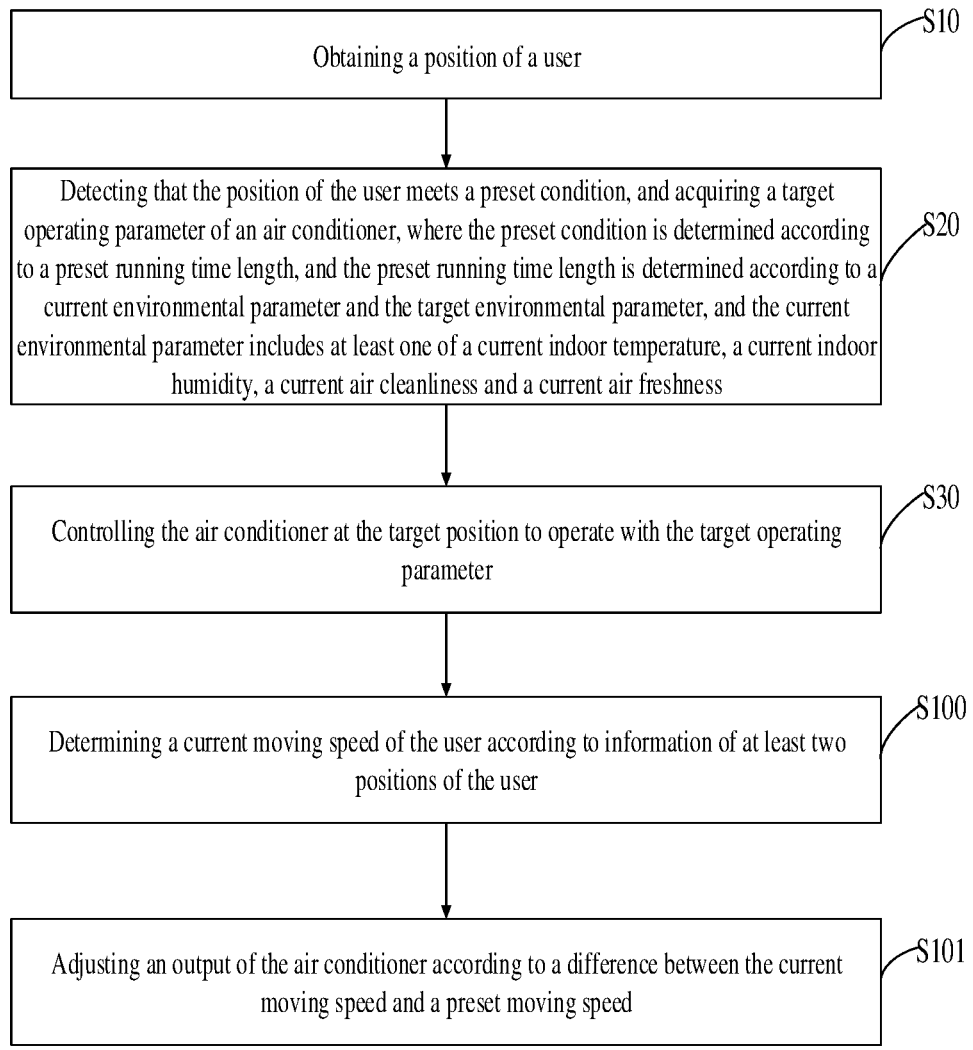
FIG. 13 is a flow diagram of a tenth embodiment of the air conditioner control method of the present application.

In a tenth embodiment, as shown in FIG. 13, following the step of controlling the air conditioner to operate with the target operating parameter based on the above-described embodiments of FIG. 2 to FIG. 12, the method further includes:

Step S100, determining a current moving speed of the user according to information of at least two positions of the user.

Step S101, adjusting an output of the air conditioner according to a difference between the current moving speed and a preset moving speed.

In this embodiment, the larger the difference between the current moving speed and the preset moving speed is, the larger the output will be. When the air conditioner runs in the cooling mode, the output is the cooling energy output. When the air conditioner runs in the heating mode, the output is the heating energy output.

When the user goes to the target position, the moving speed of the user is not constant, and the moving speed of the user determines the amount of cooling energy or heating energy output by the air conditioner. In this regard, the air conditioner determines the current moving speed of the user according to the position of the user obtained in real time, and compares the current moving speed with the preset moving speed. If the difference between the current moving speed and the preset moving speed is large, it is necessary to adjust the amount of the cooling energy or heating energy output by the air conditioner. The preset moving speed is a moving speed when determining the starting of the air conditioner. The greater the difference between the current moving speed and the preset moving speed is, the greater the amount of the cooling energy or heating energy output by the air conditioner will be, that is, the current moving speed is greater than the preset moving speed. When the current moving speed is less than the preset moving speed, the difference between the two is negative, and the smaller the difference is, the smaller the cooling energy or heating energy output of the air conditioner will be.

In the technical solution provided by this embodiment, the air conditioner adjusts the output of cooling or heating in real time according to the current moving speed of the user, thereby adjusting the operating parameters according to the actual situation that the user goes to the target position, and the air conditioner has a high degree of intelligence.

Figure 14:
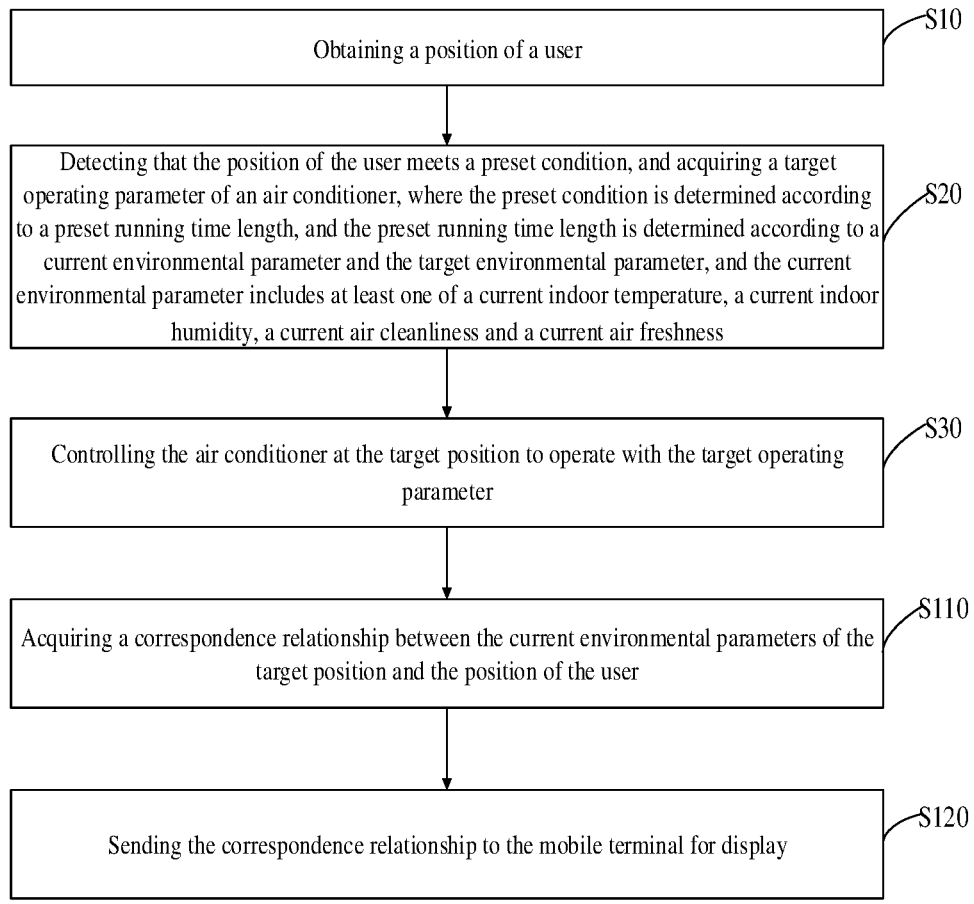
FIG. 14 is a flow diagram of an eleventh embodiment of the air conditioner control method of the present application.

In an eleventh embodiment, as shown in FIG. 14, following the step of controlling the air conditioner to operate with the target operating parameter based on the above-described embodiments of FIG. 2 to FIG. 13, the method further includes:

Step S110, acquiring a correspondence relationship between the current environmental parameters of the target position and the position of the user.

Step S120, sending the correspondence relationship to the mobile terminal for display.

In this embodiment, after the air conditioner is operated according to the target operating parameters, the terminal will determine the correspondence relationship between the current environmental parameters and the user's position, and the correspondence relationship is the relationship between the current position of the user and the corresponding current environmental parameters of the target position.

For example, if the air conditioner cools, the air conditioner determines an indoor temperature drop rate according to the time span for the temperature to reach the target temperature, and the air conditioner can determine the correspondence relationship between the user's position and the indoor temperature according to the user's moving speed, the time span for the temperature to reach the target temperature and the indoor temperature drop rate. For example, when the air conditioner is started, the indoor temperature is 34° C., the target indoor temperature is 26° C., the moving speed of the user is 100 m/min, the distance between the user and the target position is 800 m when the air conditioner is started, and the time span for the temperature to reach the target temperature is 8 min. When the user is 600 m away from the target position, the indoor temperature is 32° C. At this time, the air conditioner sends 600 m and 32° C. to the mobile terminal, so that the mobile terminal displays that the indoor temperature is 32° C. when the user is 600 m away from home. Of course, the mobile terminal can display on an electronic map that the position of the user on the electronic map is 600 m away from the target position, and the indoor temperature of the target position is 32° C.

In this way, the user can know the current environmental parameters of the target position, and the user experience is improved.

In an embodiment, the correspondence relationship is displayed in a preset shape, the boundary points on the preset shape includes the position of the user, and the boundary points constitute a current environmental parameter line, the temperatures on the current environmental parameter line are the same indoor temperature, and the preset shape is a circle or a polygon.

It should be noted that, there are many routes for users to go to the target position, and the routes are different from each other. For example, route A has a turn, while route B does not have a turn, the spent times to reach the target position are the same, the relative distances between the user and the target position are different. A relative distance refers to a length of a straight line between the user's position and the target position, so the shape is a polygon. When the preset shape is a circle, the center of the circle is the target position, and the radius of the circle is the relative distance between the user's position and the target position.

In an embodiment, values of the current environmental parameters of the same category are different in the correspondence relationship displayed by the mobile terminal, and the current environmental parameter is the current indoor temperature in the following example.

Figure 15:
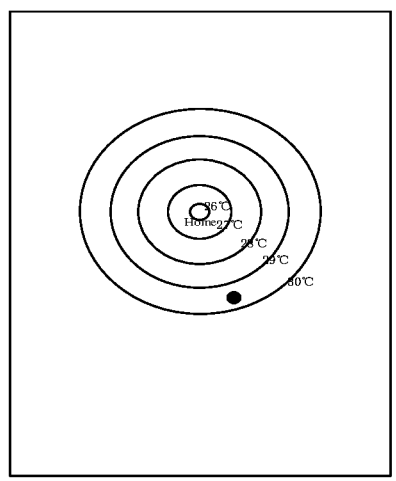
FIG. 15 is an exemplary diagram showing current environmental parameters according to an embodiment of the air conditioner control method of the present application.

At present, that is, the mobile terminal will display the indoor temperature corresponding to each position on the route from the time the air conditioner is started to the time the user arrives home. Taking the preset shape to be a circle as an example, referring to FIG. 15, FIG. 15 is a schematic diagram showing the correspondence relationship between the current indoor temperature of the target position and the position of the user displayed by the mobile terminal, the target position is the home in FIG. 15, and the current position of the user is the black dot in FIG. 15.

In addition, the air conditioner can only send the correspondence relationship corresponding to the current position of the user to the mobile terminal.

In addition, the air conditioner can also send the correspondence relationship corresponding to the target environmental parameter to the mobile terminal, where the target environmental parameter is determined according to the temperature set by the user or the habitual temperature of the user, and the habitual temperature is the habitual temperature corresponding to the user at the target position. For example, when the user sets the temperature to 28° C. or the user's habitual temperature corresponding to the target position is 28° C., the mobile terminal can display the correspondence relationship corresponding to 28° C. Of course, the correspondence relationship can also be displayed when the user's position reaches a position corresponding to that the indoor temperature is 28° C.

Alternatively, the target environmental parameter may be determined according to the user's usage habits of using the air conditioner.

Figure 16:
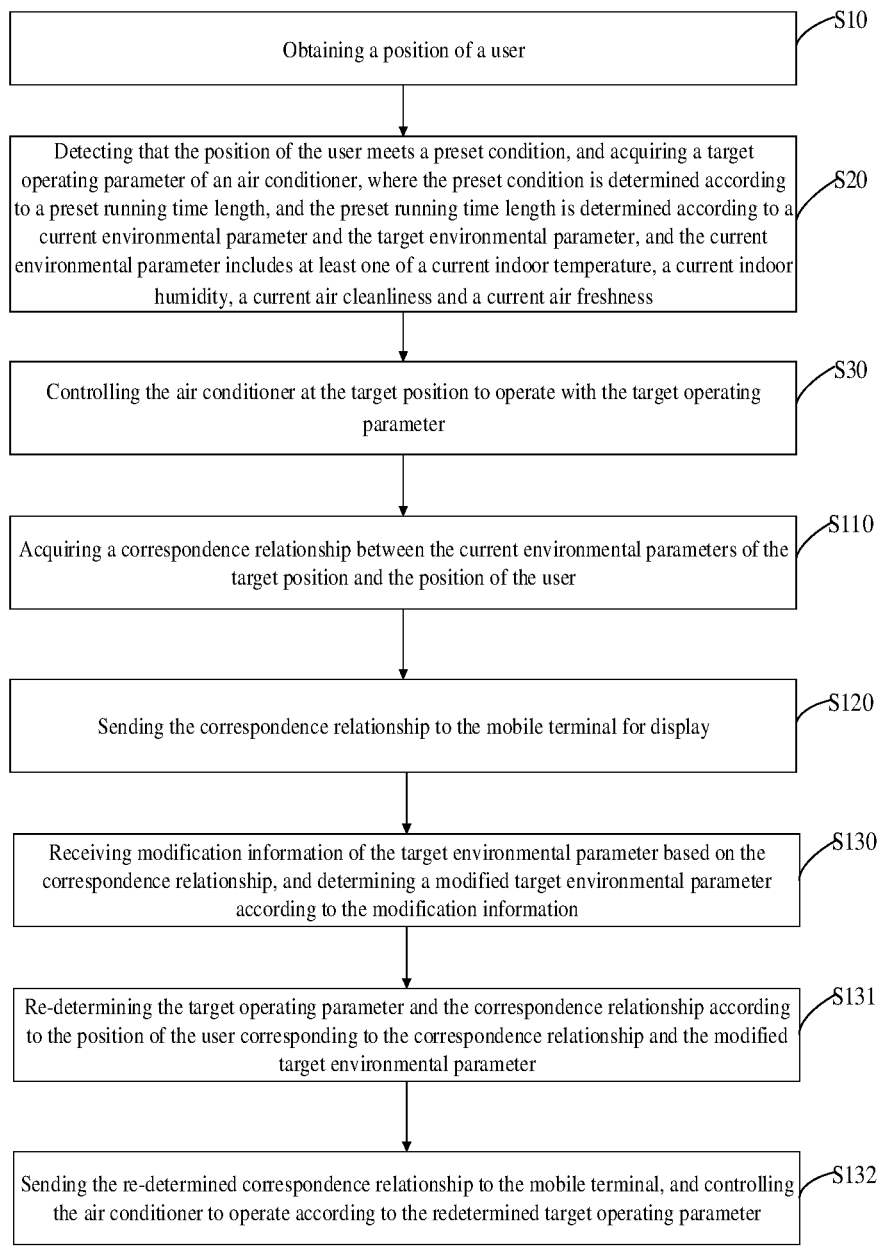
FIG. 16 is a flow diagram of a twelfth embodiment of the air conditioner control method of the present application.

In a twelfth embodiment, as shown in FIG. 16, after the step of sending the correspondence relationship to the mobile terminal based on the above-described embodiments of FIG. 2 to FIG. 15, the method further includes:

Step S130, receiving modification information of the target environmental parameter based on the correspondence relationship, and determining a modified target environmental parameter according to the modification information.

Step S131, re-determining the target operating parameter and the correspondence relationship according to the position of the user corresponding to the correspondence relationship and the modified target environmental parameter.

Step S132, sending the re-determined correspondence relationship to the mobile terminal, and controlling the air conditioner to operate according to the re-determined target operating parameter.

In this embodiment, when the mobile terminal displays the correspondence relationship, the user can modify the target environmental parameters based on the correspondence relationship. Taking the target environmental parameter to be the target indoor temperature as an example, for example, the mobile terminal displays multiple temperature lines, and the user clicks the temperature on the temperature lines to modify the temperature, such as changing 28° C. to 27° C. The mobile terminal packs the correspondence relationship corresponding to the modified temperature line and 27° C. as the modification information, and sends the modification information to the air conditioner. The air conditioner determines the indoor temperature modified by the user according to the correspondence relationship. That is, 27° C. is determined. The air conditioner also determines the modified position of the user corresponding to the correspondence relationship, and re-determines a correspondence relationship and a target operating parameter according to the modified position of the user of the correspondence relationship and the modified indoor temperature, so that the air conditioner operates according to the re-determined target operating parameter, and the re-determined correspondence relationship is sent to the mobile terminal for display. For example, with the above distance, the user's position with a correspondence relationship of 28° C. is 600 m away from the target position. If the user modifies 28° C. to 27° C., the air conditioner needs to determine the difference between the indoor temperature corresponding to the current position of the user and 27° C., and then adjust the target operating parameters according to the difference. In addition, because the user modifies 600 m-28° C. to 600 m-27° C. The indoor temperature drop rate corresponding to the target position will become larger. For example, the original drop rate is 1° C./min, but after the correspondence relationship is modified, the drop rate become 1.2° C./min, so that the original 500 m-27° C. is changed to 500 m-25.8° C. Therefore, the air conditioner needs to re-determine each correspondence relationship and send the re-determined correspondence relationship to the mobile terminal.

Of course, the user can modify the correspondence relationship on the mobile terminal in advance. The air conditioner first re-determines the correspondence relationship according to the modified information, and sends the correspondence relationship to the mobile terminal for the user to view. If the user confirms again, the air conditioner re-determines the target operating parameters according to the modification information, and operates according to the re-determined target operating parameters, so that the user knows the final target environmental parameters of the target position after the target environmental parameters of the correspondence relationship are modified, thereby enabling the user to made the modification of the target environmental parameters in line with the user's own wishes.

In the technical solution provided by this embodiment, the user can modify the target environmental parameters based on the correspondence relationship between the target environmental parameters displayed by the mobile terminal and the user's position, so that the operation of the air conditioner conforms to the user's wishes.

In an embodiment, the target position is determined based on the current time period, the user's schedule, or the location entered by the user. For example, the mobile terminal can push the user's position to the air conditioner, and the air conditioner can determine which time period the user goes to which place. For example, 6:00 pm-7:00 pm from Monday to Thursday is the user's home time, and 9:00 am-10:00 am from Monday to Friday is the user's working time. The air conditioner determines the target position according to the current time period. The user can set up a schedule on the mobile terminal or on the air conditioner, which records which time period arriving at which position, thus the air conditioner can determine the target position according to the schedule. In addition, the user can also input a place on the mobile terminal, and the mobile terminal pushes the information to an air conditioner corresponding to the place, that is, the input place is the target position.

In the technical solution provided by this embodiment, the air conditioner can determine the target position according to the current time period, the schedule of the user or the place input by the user, so that the air conditioner at the target position can precooling or preheating the target position, and the air conditioner has a high degree of intelligence.

The present application also provides an air conditioner, the air conditioner includes a memory, a processor, and an air conditioner control program stored in the memory and executable by the processor. When the air conditioner control program is executed by the processor, each step of the air conditioner control method described in the above embodiments is realized.

The present application also provides an air conditioner control terminal. The air conditioner control terminal includes a memory, a processor, and an air conditioner control program stored in the memory and executable by the processor. When the air conditioner control program is executed by the processor, each step of the air conditioner control method described in the above embodiments is realized.

In addition, the present application also provides a server, which includes a memory, a processor and an air conditioner control program stored in the memory and executable by the processor. When the processor executes the air conditioner control program, the steps of the air conditioner control method described in the above embodiments are realized.

In addition, the present application also provides a computer-readable storage medium, which includes an air conditioner control program, when the air conditioner control program is executed by a processor, the steps of the air conditioner control method described in the above embodiments are realized.

The above serial numbers of the embodiments of the present application are for description only and do not represent the superiority and inferiority of the embodiments.

From the description of the above embodiments, it will be clear to those skilled in the art that the method of the above embodiments can be implemented by means of software plus the necessary common hardware platform, or of course by means of hardware, but in many cases the former is preferred. Based on this understanding, the technical solution of the present application can be embodied in the form of software products in essence or the part that contributes to the prior art. The computer software product is stored in a storage medium (e.g. ROM/RAM, magnetic disk, optical disk) as described above and includes instructions for causing a terminal device (which may be a television, a mobile phone, a computer, a server, an air conditioner, or a network device, etc.) to perform the methods described in various embodiments of the present application.

The present application is described with reference to flowcharts and/or block diagrams of methods, apparatus (systems) and computer program products of the embodiments of the present application. It should be understood that each flow and/or block in the flow chart and/or the block diagram, as well as combinations of the flows and/or blocks in the flow chart and/or the block diagram, may be implemented by computer program instructions. These computer program instructions may be provided to a processor of a general purpose computer, a special purpose computer, an embedded processor, or another programmable data processing device to generate a machine, such that instructions executed by a processor of a computer or another programmable data processing device generate means for performing the functions specified in one or more flows of the flow chart and/or one or more blocks of the block diagram.

These computer program instructions may also be stored in a computer readable memory that directs a computer or another programmable data processing device to operate in a specific manner, so that the instructions stored in the computer readable memory are caused to produce an article of manufacture including instruction means that perform the functions specified in one or more flows of the flow chart and/or one or more blocks of the block diagram.

These computer program instructions may also be loaded onto a computer or another programmable data processing device, such that a series of operational steps are executed on a computer or another programmable device to produce a computer-implemented process, such that instructions executed by the computer or another programmable device provide steps for implementing the functions specified in one or more flows of the flow chart and/or one or more blocks of the block diagram.

It should be noted that in the claims, no reference numeral placed in the parentheses should be constructed as limiting the claims. The word "comprise" does not exclude the existence of components or steps not listed in the claims. The word "a" or "an" before an element does not preclude the existence of multiple such elements. The present application may be implemented by means of hardware including several different components and by means of a suitably programmed computer. In a claim enumerating a number of devices, several of these devices may be embodied by the same hardware. The use of words first, second, and third does not indicate any order. These words can be interpreted as names.

Although the preferred embodiments of the present application have been described, additional changes and modifications may be made to these embodiments once the basic inventive concept are known to those skilled in the art. Therefore the appended claims are intended to be interpreted to encompass the preferred embodiments as well as all modifications and variations falling within the scope of the present application.

Apparently those skilled in the art may make various modifications and variations to the present application without departing from the spirit and scope of the present application. Thus the present application is intended to include such modifications and variations if they fall within the scope of the claims and their equivalents.

The above are only preferred embodiments of the present application, and are not therefore limiting the patent scope of the present application. Any equivalent structure or equivalent process transformation made by using the contents of the specification and drawings of the present application, or any direct or indirect application to other related technical fields, are equally included in the patent scope of the present application.

What is claimed is:

1. An air conditioner control method comprising:
   acquiring a position of a user;
   determining a preset running time span of an air conditioner at a target position according to a current environmental parameter and a target environmental parameter, wherein the current environmental parameter comprises at least one of: a current indoor temperature, a current indoor humidity, a current air cleanliness, or a current air freshness;
   detecting that the position of the user meets a preset condition based on the preset running time span;
   obtaining a target operating parameter of the air conditioner;
   controlling the air conditioner to operate with the target operating parameter;
   acquiring a correspondence relationship between the target environmental parameter and the position of the user; and
   sending the correspondence relationship to a mobile terminal for display as a circle or polygon where boundary points on the circle or polygon comprise the position of the user and constitute a current environmental parameter line of the target position.

2. The air conditioner control method according to claim 1, wherein, before the detecting that the position of the user meets the preset condition and the obtaining the target operating parameter of the air conditioner, the air conditioner control method further comprises:
   acquiring current environmental parameters and target environmental parameters of a space where the air conditioner is located;
   determining running time spans required by the air conditioner to make the current environmental parameters reach the corresponding target environmental parameters, wherein the current environmental parameters comprise at least two of the current indoor temperature, the current indoor humidity, the current air cleanliness and the current air freshness; and
   determining the preset running time span of the air conditioner according to the running time spans.

3. The air conditioner control method according to claim 2, wherein the determining the preset running time span of the air conditioner according to the running time spans comprises:
   determining the preset running time span according to a running time span corresponding to a target environmental parameter with the highest priority; or
   determining the preset running time span according to the longest one of the running time spans; or
   taking all the running time spans as the preset running time span.

4. The air conditioner control method according to claim 1, wherein the preset condition comprises a pre-start condition of the air conditioner, and the position of the user meeting the pre-start condition of the air conditioner comprises at least one of the following:
   the position of the user being in a first preset range;
   a time span required for the user to reach the target position from the position being less than or equal to a first preset time span; and
   receiving a pre-start instruction sent from a mobile terminal, wherein the mobile terminal detects that the position of the user is within the first preset range, or the time span required for the user to reach the target position is less than or equal to the first preset time span, and sends out the pre-start instruction.

5. The air conditioner control method according to claim 4, further comprising:
   determining that the position of the user meets the preset condition, and sending first prompt information for starting the air conditioner in advance to the mobile terminal; and
   receiving first confirmation information, and performing the step of obtaining the target operating parameter of the air conditioner.

6. The air conditioner control method according to claim 4, further comprising:
   determining that the position of the user meets the preset condition, and sending second prompt information for modifying an operating parameter of the air conditioner to the mobile terminal; and
   receiving second confirmation information sent from the mobile terminal, acquiring a modified operating parameter according to the second confirmation information, and modifying the target operating parameter according to the modified operating parameter.

7. The air conditioner control method according to claim 5, wherein, after the sending the first prompt information for starting the air conditioner in advance to the mobile terminal, the air conditioner control method further comprises:
   upon receiving the first confirmation information and detecting that the position of the user meets a starting condition of the air conditioner, executing the obtaining the target operating parameter of the air conditioner;
   wherein the position of the user meeting the starting condition of the air conditioner comprises at least one of the following:
   a current position of the user being in a second preset range, wherein a distance between the first preset range and the air conditioner is greater than a distance between the second preset range and the air conditioner;
   a time span required for the user to reach the target position from the current position being less than or equal to a second preset time span less than the first preset time span; and
   receiving a starting instruction sent from the mobile terminal, wherein the mobile terminal detects that the position of the user is within the second preset range, or that the time span required for the user to reach the target position is less than or equal to the second preset time span, and sends out the starting instruction.

8. The air conditioner control method according to claim 7, wherein the first preset range and the second preset range are determined according to the preset running time span, a moving speed of the user, and a route taken by the user to the target position.

9. The air conditioner control method according to claim 8, wherein the route and the moving speed are determined according to at least one of a travel way of the user and road condition information corresponding to a current time period.

10. The air conditioner control method according to claim 7, wherein, before the detecting that the position of the user meets the preset condition and the obtaining the target operating parameter of the air conditioner, the air conditioner control method further comprises:
forming a shape according to a plurality of starting positions corresponding to the second preset range; and
outputting fourth prompt information according to the shape.

11. The air conditioner control method according to claim 10, wherein the forming the shape according to the plurality of starting positions corresponding to the second preset range comprises:
when the air conditioner has at least two preset running time spans, determining a second preset range according to each of the at least two preset running time spans;
connecting a plurality of starting positions corresponding to each second preset range to form a shape corresponding to each second preset range; and
marking the shape corresponding to each second preset range according to a target environmental parameter corresponding to each second preset range.

12. The air conditioner control method according to claim 11, wherein after the outputting the fourth prompt information according to the shape, the air conditioner control method further comprises:
receiving a response instruction corresponding to the fourth prompt information, and acquiring the shape targeted by the response instruction; and
updating the starting condition of the air conditioner according to the second preset range corresponding to the acquired shape.

13. The air conditioner control method according to claim 1, wherein the target operating parameter is determined according to at least one of: an operating parameter set by the user, a habitual operating parameter corresponding to the user, a district where the air conditioner is located, a group the user belongs, a current time period, a dressing index of users, and a current weather parameter.

14. The air conditioner control method according to claim 1, wherein after the obtaining the position of the user, the air conditioner control method further comprises:
determining that the position of the user meets the preset condition, and obtaining an image of a space where the air conditioner is located;
determining that the space is not closed to an external environment according to the image, and sending third prompt information that the space where the air conditioner is located is not closed to the external environment to the mobile terminal, so that the user can determine whether to accept the air conditioner to run in advance based on the mobile terminal; and
receiving third confirmation information, and performing the obtaining the target operating parameter of the air conditioner.

15. The air conditioner control method according to claim 1, wherein after the controlling the air conditioner to operate with the target operating parameter, the air conditioner control method further comprises:
acquiring a change amount of an environmental parameter of the air conditioner in a fourth preset time span; and
determining that the change amount of the environmental parameter is smaller than a preset change amount of the environmental parameter and a difference between the preset change amount of the environmental parameter and the change amount of the environmental parameter is larger than a preset difference value, and increasing an output of the air conditioner,
wherein the output is cooling energy when the air conditioner runs in a cooling mode, and the output is heating energy when the air conditioner runs in a heating mode.

16. The air conditioner control method according to claim 15, wherein the preset change amount of the environmental parameter is determined according to the preset running time span and a value of the environmental parameter corresponding to that the position of the user meets the preset condition.

17. The air conditioner control method according to claim 1, wherein after the controlling the air conditioner to operate with the target operating parameter, the air conditioner control method further comprises:
determining a distance between the user and the target position according to a current position of the user; and
determining that the distance is greater than a target distance, and controlling the air conditioner to stop, wherein the target distance is determined according to the preset running time span.

18. The air conditioner control method according to claim 1, wherein after the controlling the air conditioner to operate with the target operating parameter, the air conditioner control method further comprises:
determining a current moving speed of the user according to information of at least two positions of the user; and
adjusting an output of the air conditioner according to a difference between the current moving speed and a preset moving speed, wherein the difference between the current moving speed and the preset moving speed correlates to the output, wherein the output is cooling energy when the air conditioner is in a cooling mode and the output is heating energy when the air conditioner is in a heating mode.

19. The air conditioner control method according to claim 1, further comprising
sending a correspondence relationship corresponding to a current position of the user to the mobile terminal; or
sending a correspondence relationship corresponding to the target environmental parameter to the mobile terminal, wherein the target environmental parameter is preset by the user or determined according to a usage habit of the user using the air conditioner.

20. The air conditioner control method according to claim 1, wherein the target position is determined based on a current time period, the user's schedule, or a place input by the user.

21. An air conditioner comprising a memory, a processor, and an air conditioner control program stored in the memory and executable by the processor, the air conditioner control program, when executed by the processor, implementing the air conditioner control method according to claim 1.

22. An air conditioner control terminal comprising a memory, a processor, and an air conditioner control program stored in the memory and executable by the processor, the air conditioner control program, when executed by the processor, implementing the air conditioner control method according to claim 1.

23. A server comprising a memory, a processor, and an air conditioner control program stored in the memory and executable by the processor, the air conditioner control program, when executed by the processor, implementing the air conditioner control method according to claim 1.

24. A non-transitory computer-readable storage medium for storing an air conditioner control program executable by a processor,
wherein the air conditioner control program, when executed by the processor, implements the air conditioner control method according to claim 1.

25. An air conditioner control method comprising:
acquiring a position of a user;
determining a preset running time span of an air conditioner at a target position according to a current environmental parameter and a target environmental parameter, wherein the current environmental parameter comprises at least one of: a current indoor temperature, a current indoor humidity, a current air cleanliness, or a current air freshness;
detecting that the position of the user meets a preset condition based on the preset running time span;
obtaining a target operating parameter of the air conditioner;
controlling the air conditioner to operate with the target operating parameter;
acquiring a correspondence relationship between the target environmental parameter and the position of the user;
sending the correspondence relationship to a mobile terminal for display;
receiving modification information of the target environmental parameter based on the correspondence relationship;
determining a modified target environmental parameter according to the modification information;
re-determining a target operating parameter and a correspondence relationship according to the position of the user corresponding to the correspondence relationship and the modified target environmental parameter;
sending the re-determined correspondence relationship to the mobile terminal; and controlling the air conditioner to operate according to the re-determined target operating parameter.

26. An air conditioner control method comprising:
acquiring a position of a user;
for a plurality of current environmental parameters at a target position, determining respective running time spans of an air conditioner corresponding to the target position to reach respective target environmental parameters,
wherein:
the current environmental parameters comprise a plurality of: a current indoor temperature, a current indoor humidity, a current air cleanliness, and a current air freshness; and
the target environmental parameters comprise a plurality of: a target indoor temperature, a target indoor humidity, a target air cleanliness, and a target air freshness;
obtaining a target operating parameter of the air conditioner;
determine a running time span for the air conditioner based on the running time spans by:
selecting the running time span from the running time spans based on the running time span corresponding to a target environmental parameter with a highest priority;
selecting the running time span from the running time spans based on the running time span having a longest time; or
averaging the running time spans;
determining that the position of the user meets a preset condition based on the determined running time span; and
controlling the air conditioner to operate according to a target environmental parameter corresponding to the determined running time span.

\* \* \* \* \*